USOO5484374A

United States Patent [19]
Bachner et al.

[11] Patent Number: 5,484,374
[45] Date of Patent: Jan. 16, 1996

[54] METHOD AND APPARATUS FOR ATTACHING A SPOUT TO A CONTAINER

[75] Inventors: Jerry G. Bachner; A. S. Worrell, both of Algonquin, Ill.

[73] Assignee: Nimco Corporation, Crystal Lake, Ill.

[21] Appl. No.: 783,038

[22] Filed: Oct. 25, 1991

[51] Int. Cl.$^6$ ........................................... B31B 1/90
[52] U.S. Cl. ................................. 493/87; 493/12; 493/14; 53/133.2
[58] Field of Search ....................... 493/8, 10, 12, 493/13, 14, 87, 214; 53/133.2

[56] References Cited

U.S. PATENT DOCUMENTS

| | | | |
|---|---|---|---|
| 4,788,811 | 12/1988 | Kawajiri et al. | 493/87 |
| 4,964,562 | 10/1990 | Gordon | 493/87 |
| 5,219,320 | 6/1993 | Abrams et al. | 493/87 |
| 5,267,934 | 12/1993 | Pape et al. | 493/87 |
| 5,366,433 | 11/1994 | McCormick | 493/87 |

FOREIGN PATENT DOCUMENTS

| | | | |
|---|---|---|---|
| 3288636 | 12/1991 | Japan | 493/87 |
| 2238287 | 5/1992 | United Kingdom. | |

OTHER PUBLICATIONS

International Paper Brochure, Published at least as early as 1991.

Primary Examiner—Bruce M. Kisliuk
Assistant Examiner—Eileen Morgan
Attorney, Agent, or Firm—Jenner & Block

[57] ABSTRACT

An applicator and accompanying feed mechanism attaches spouts and other fitments to paperboard cartons and the like in automated packaging equipment. The applicator features a rotatable and translatable anvil having a plurality of radially extending lobes. A mandrel or other engagement mechanism on each lobe engages and holds spouts for attachment to a container. The anvil inserts a spout into a container hole, and an ultrasonic sealer ultrasonically vibrates the carton wall against the anvil to weld the spout to the carton.

108 Claims, 22 Drawing Sheets

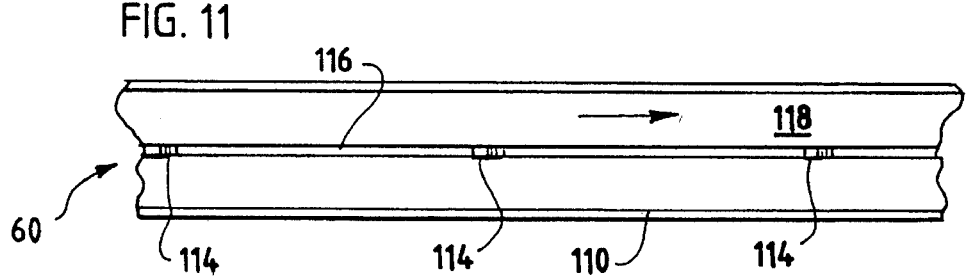
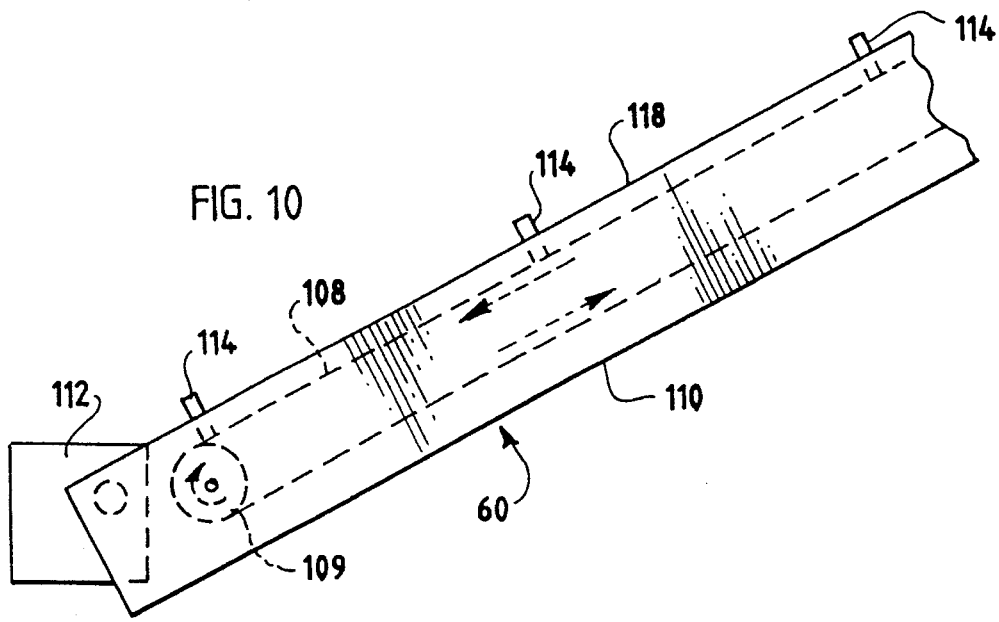
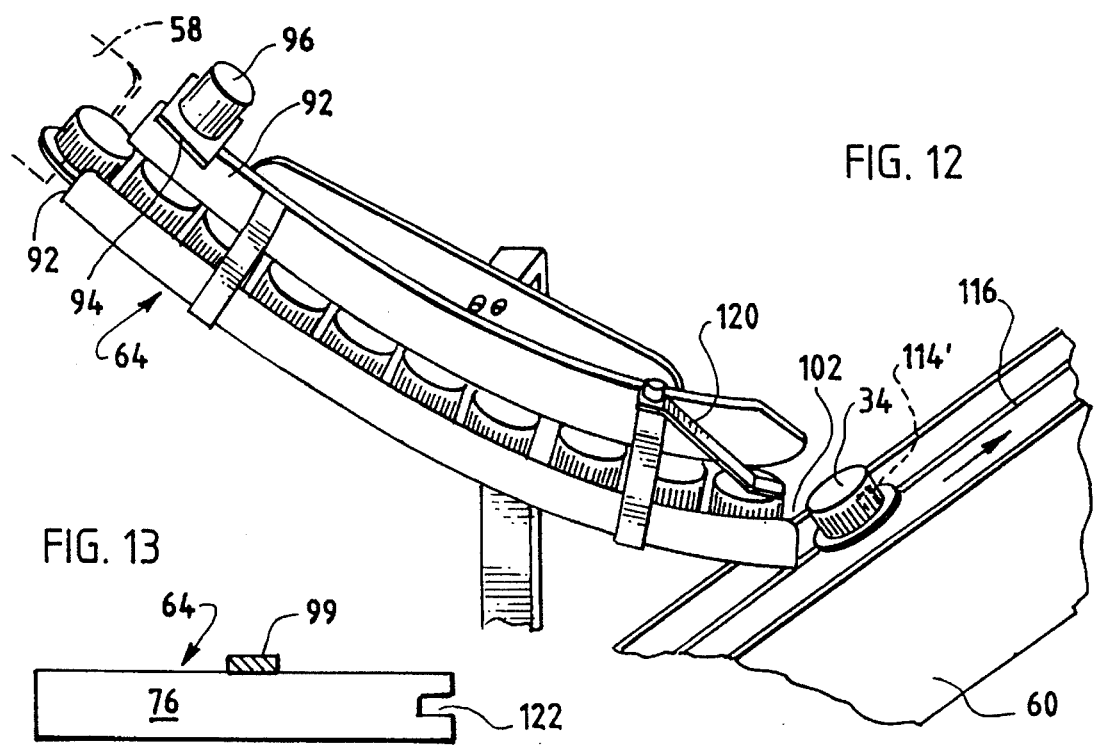

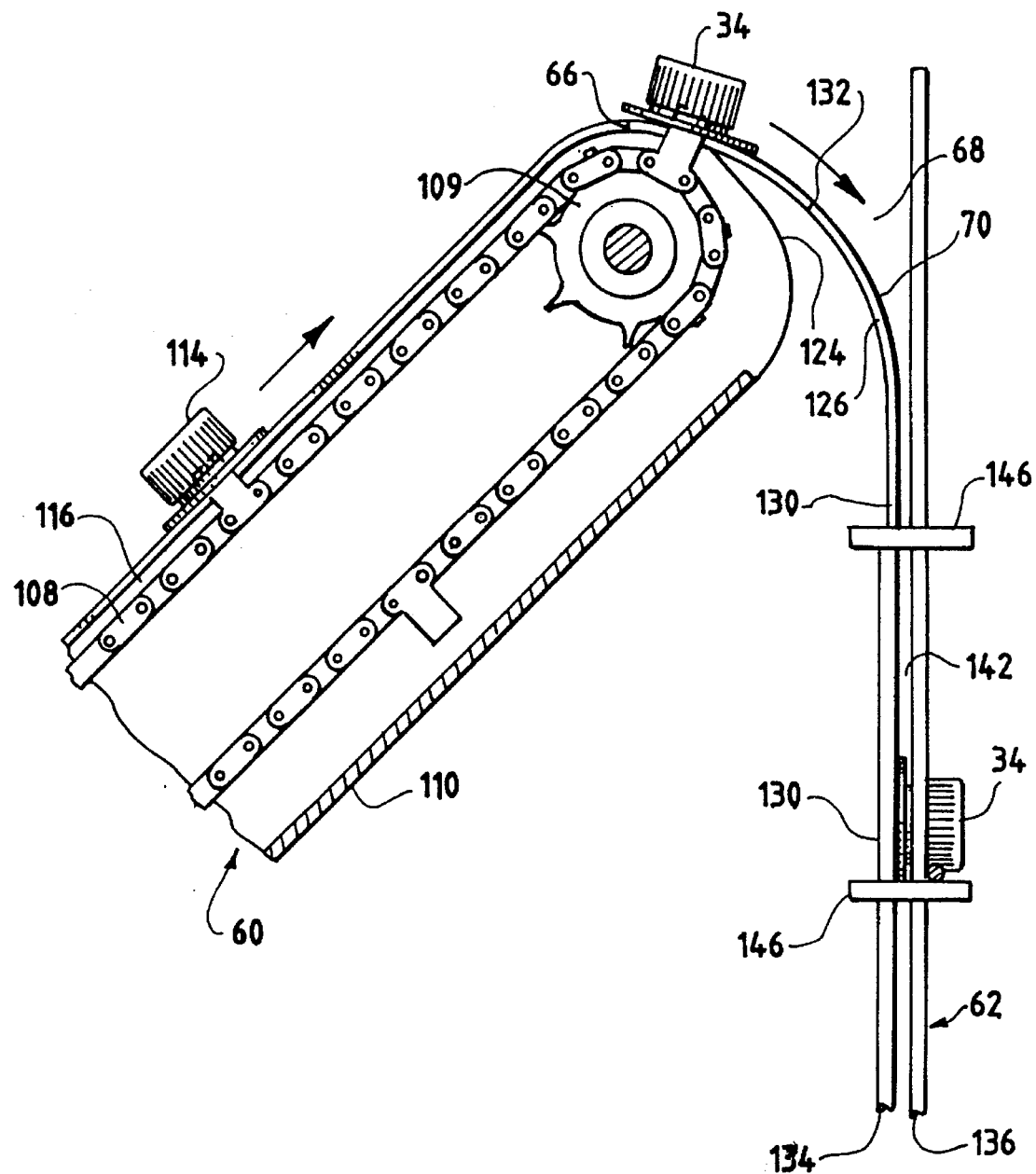

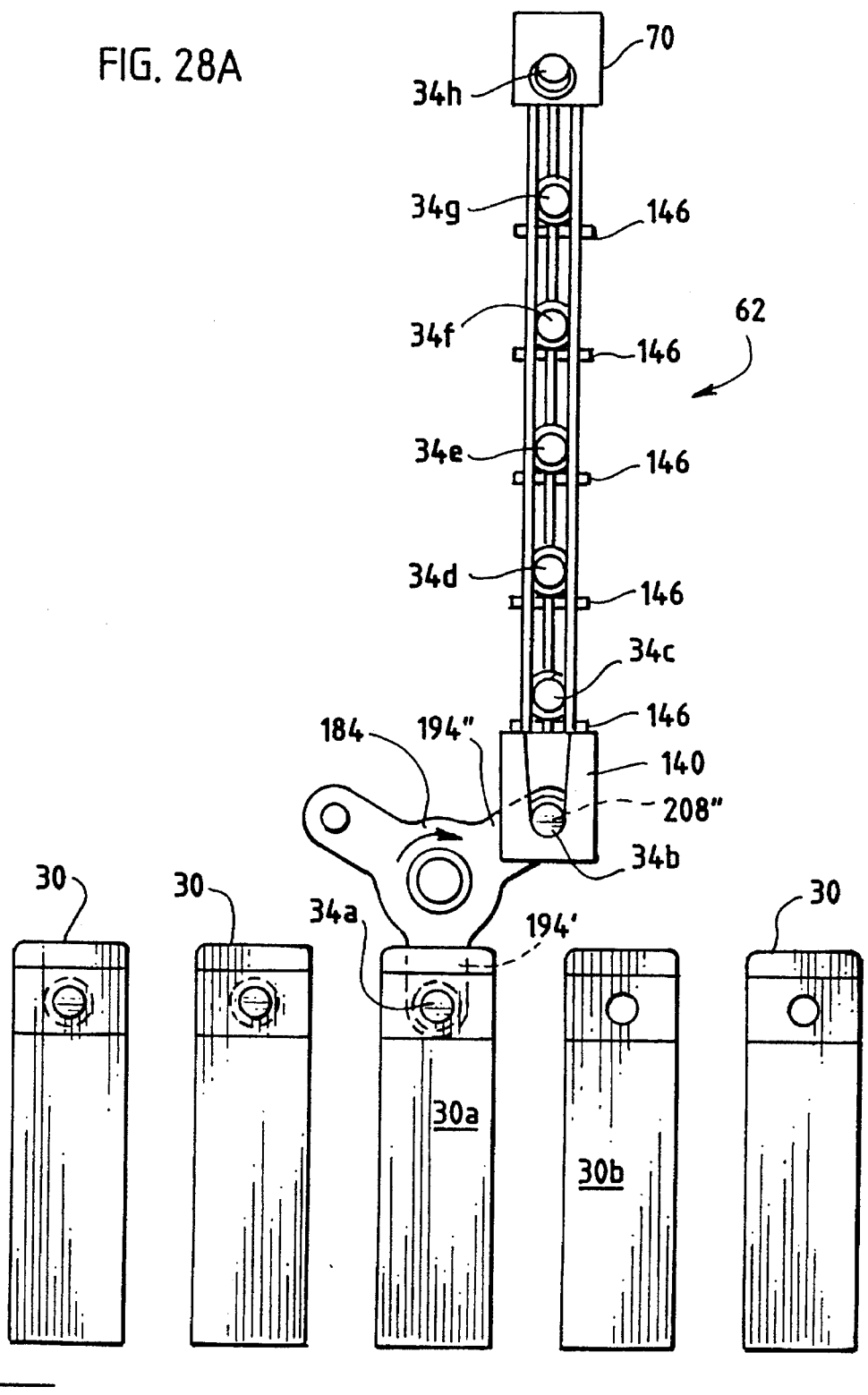

METHOD AND APPARATUS FOR ATTACHING A SPOUT TO A CONTAINER

FIELD OF THE INVENTION

The invention relates to machinery for manufacturing containers, and in particular to machinery for attaching reclosable spouts to containers such as paperboard cartons used for holding liquids and solids and the like.

BACKGROUND OF THE INVENTION

A common and useful type of container is the paperboard carton having a gabled top. Examples of such cartons include the everyday milk carton. In recent years, these cartons have been used for numerous other products, including foods, beverages and detergents. These cartons are typically coated or laminated with a heat-sealable plastic, which is used by manufactures to seal the cartons.

Typically, the contents of these cartons are dispensed by ripping open the gable top and unfolding a pourable spout. Once the carton is ripped open, it cannot be tightly resealed. To address this problem, cartons have been devised with reclosable spouts. These spouts are also referred to in the field has fitments, closures and caps. For convenience, they are referred to in this Application as simply "reclosable spouts".

A conventional spout is opened and closed by means of a removable cap, snap, hatch or the like. In the case of a capped spout, a person using the carton removes the cap to dispense the contents of the carton (typically a beverage). Because the carton has not been torn open, the contents can be tightly resealed.

Cartons having reclosable spouts are typically manufactured with automatic machinery (often referred to as "packaging machinery") which forms the carton from a flat piece (or "blank") of paperboard or other suitable material. After the carton has been partially formed (but not filled or sealed), the reclosable spout is attached. A typical spout consists of a plastic cylinder having a mounting flange at one end and a threaded, removable cap (or other conventional closure) at the other. The spout is mounted from inside the carton through a preformed hole formed in the paperboard blank so that the capped-end extends outward, while the flange is flush against the interior side of the carton wall. The flange is then ultrasonically welded to the wall of the carton. Examples of these types of containers and spouts are provided by U.S. Pat. No. 4,964,562, issued on Oct. 23, 1990 to Gordon, and U.S. Pat. No. 4,601,425, issued on Jul. 22, 1986 to Bachner.

The component of packaging machinery which attaches spouts to cartons is often referred to as an "applicator". Typically, applicators operate in two distinct steps. First, before the carton is filled and sealed, the applicator inserts the spout through the die cut hole. The applicator then moves the carton to a second station, where an anvil is placed inside the carton to firmly hold the spout's flange against the carton wall. An ultrasonic sealer located outside the carton then welds the flange to the carton.

While workable, these two-step applicators have a number of drawbacks. First, the use of more than one step is slower and less reliable. Ideally, a one-step applicator system would insert and weld the spout at the same time, thereby providing faster and more reliable operation. Second, prior to welding, the two-step applicator does not firmly hold the spout after insertion in the die cut hole. In some cases, the spout may shift position or even fall out. Ideally, the spout is subject to full mechanical control until it has been firmly welded. In this manner, the timing and positioning of the weld can be precisely controlled for better efficiency and quality.

In other kinds of applicators, the spout is placed in the ultrasonic sealer just prior to welding. The ultrasonic sealer then inserts the spout into the die cut hole just prior to welding. Because the ultrasonic sealer (by virtue of its size) is on the outside of the carton, this approach has the drawback of requiring that each spout's mounting flange must also be on the outside (as opposed to inside) of the carton. Flanges mounted on the outside of the carton are less desirable because they do not form as strong or reliable an attachment as flanges mounted on the inside. Moreover, the outside mounted flanges tend to be unsightly and make the carton less attractive to consumers. Additionally, when the flange is mounted on the outside, the contents of the carton are exposed to the raw paperboard edge forming the perimeter of the die cut hole. This exposure results in leakage or "wicking".

One problem common to all applicators is that they must be provided with a steady supply of spouts. Typically, a bulk supply of spouts is stored in a large bin placed on the factory floor. A bucket conveyor belt carries multiple loads of spouts to an elevated prefeeder or hopper. From the elevated hopper, the spouts are fed to an elevated centrifugal feeder. From the elevated centrifugal feeder, the spouts are delivered into the applicator by downwardly sloping gravity feed tracks.

While workable, this type of feeding system allows the spouts to bunch up along the gravity feed tracks. This bunching can cause the flanges of one spout to become jammed between the flange and cap of an adjacent spout, thereby preventing the feed mechanism from working properly. Ideally, a feed system would be avoid the necessity of having an elevated hopper or feeder, and would avoid above-described jamming problem.

SUMMARY OF THE INVENTION

To overcome the drawbacks of the prior art, an apparatus and method is provided for attaching reclosable spouts to containers such as cartons. In the preferred embodiment, an anvil is provided which can grasp and release spouts, so that the spouts may be inserted from the inside of the carton and welded in just one operation. Moreover, the spout is firmly grasped by the anvil until it is welded. This provides complete mechanical control over the position of the spout, thereby improving the quality and reliability of the welding process. Additionally, in the event the spout is not successfully welded to a particular container, the spout will remain on the anvil. Thus, the container will continue along the conveyor belt without a spout. Containers without spouts can be easily detected and discarded, thereby avoiding waste and poor quality.

In some embodiments, a feed system sequentially delivers spouts to the anvil. In one embodiment, an apparatus is provided for attaching spouts to partially-formed containers such as cartons. The containers may have a heat-sealable lamination, which can be melted to weld the spouts to the containers. Because the containers are only partially formed, they have open tops which include a die cut opening (referred to herein as "preformed hole") for receiving a spout. When the containers are ultimately filled, the open tops can be sealed, leaving the spout accessible to the user for conveniently dispensing liquids, powders and the like from the container.

The apparatus includes a conveyor which conveys the containers in a conveyance direction. The conveyor moves step-wise in a periodic or "indexed" operation, conveying containers from a starting point (such as a supply magazine) to a terminus (such as a filling station). On route, the conveyor moves the containers past an anvil which is adapted for inserting spouts into the containers' preformed holes and attaching the inserted spouts to the containers.

This novel anvil preferably has a center portion that is adapted for rotation along an axis transverse to the conveyance direction. Preferably, the anvil has two or more lobes which extend radially at regular angular intervals from the center portion. Each lobe includes a mandrel for engaging a spout, and an anvil surface adjacent to the mandrel. As discussed in more detail below, a spout delivery or "feed" system sequentially positions the spouts in an escapement for serial engagement by the mandrels in between indexed movements of the conveyor. To engage a spout, the mandrel is inserted into the spout so that the spout fits over the mandrel with the spout's annular flange flush against the anvil surface.

As the conveyor moves containers past the anvil, a drive mechanism or like device rotates the anvil to sequentially position a mandrel and an adjacent anvil surface inside each of the passing containers. The rotational motion of the anvil is synchronized with the indexed operation of the conveyor. Thus, upon completion of each indexed conveyor movement, a mandrel is aligned with the container's hole for inserting a spout into the hole.

After the mandrel is aligned with a container's hole, a rotating and translating mechanism having a mechanical or pneumatic drive imparts a first translation motion to the anvil to cause the mandrel (and the spout thereon) to be inserted into the hole. As the first translational movement inserts the spout into the hole, the anvil surface adjacent the mandrel presses the spout's annular flange against the inner container wall. An ultrasonic sealer then ultrasonically vibrates the container, causing the heat-sealable laminate to melt, thereby welding the spout's flange to the inner wall of the container. Alternatively, the flange may be welded with heat from hot air, hot melt glue or other known techniques.

The translational drive means also provides a second translation motion to withdraw the mandrel from the container hole after the ultrasonic sealer has welded the spout to the container. Because the spout is attached to the container, the withdraw of the mandrel leaves the spout secured to the container, and leaves the mandrel available to accept another spout from the spout feed system.

Thus, one advantage of the present invention is that the spout is both inserted and welded into the container in a single operation (i.e., at the same station along the conveyor). This is accomplished in part by Applicants' novel placement of the engagement mandrels on the anvil.

The spout delivery system is positioned relative to the anvil so that the first translation motion also causes one of the mandrels to engage a spout, which has been positioned in an escapement for such engagement by the spout delivery system. In this manner, the same first translation motion advantageously enables a mandrel to insert a spout into the hole while another mandrel simultaneously engages the next spout.

In the preferred embodiment, the apparatus includes a novel spout feed system that is especially suited for sequentially delivering spouts from a bulk supply to a position for engagement by the anvil. The feed system features a vertical elongated channel having an upwardly opening mouth for receiving spouts. An inclined transfer conveyor transfers spouts from the bulk supply to the mouth of the elongated channel. Spouts deposited in the channel drop into an escapement, which positions the spouts for engagement by one of the mandrels, as described above. Thus, the channel forms a path originating with the channel's upwardly extending mouth and terminating at the escapement.

In some embodiments, the transfer conveyor includes a conveyor drive motor operable at adjustable speeds. Fingers or the like maintain the spouts at regularly spaced intervals along the transfer conveyor. A computer or other programmable logic control circuit adjusts the speed of the conveyor drive motor so that the rate at which the conveyor deposits spouts into the top of the elongated channel approximates the rate at which the spouts are delivered to the anvil.

The elongated channel is equipped with at least one electronically actuated retractable finger which selectively blocks and unblocks the channel to allow and inhibit passage of a spout. The finger is responsive to a control signal generated by the computer or other programmable logic control circuit or the like for allowing a spout to pass into the escapement as a container approaches the anvil on the conveyor.

Preferably, the elongated channel has several channel blocking fingers disposed along its longitudinal extent. Each of these fingers is selectively retractable for allowing the passage of spouts. The bottommost one of the fingers allows passage of a spout out of the channel and into the escapement, and is directly responsive to the control signal generated by the computer for delivering a spout to the escapement.

In the preferred embodiment, each of the channel blocking fingers is associated with a sensor, which detects whether that finger is blocking one of the spouts. Each of the blocking fingers (other than the bottommost one) is responsive (via a computer or other logic circuit) to the sensors corresponding to the next lowest finger, and will momentarily retract to allow passage of a spout thereby when that sensor indicates that no spout is blocked by the next lowest finger. Thus, with each passing container a spout advances from finger to finger until it finally falls into the escapement, where it is engaged by the anvil.

When each of the fingers is blocking a spout, the elongated channel is full, the spout conveyor drive motor is disabled so that additional spouts are not deposited into the upwardly extending mouth of the elongated channel. In this manner, the delivery system maintains the spouts separated and in a fixed orientation to reduce the possibility of jamming.

BRIEF DESCRIPTION OF THE DRAWINGS

FIG. 10 is a front view of the spout conveyor of the feed system shown in FIG. 6;

FIG. 11 is a top view of the spout conveyor of the feed system shown in FIG. 6;

FIG. 12 is an enlarged partial perspective view of the bottom transfer chute and the spout conveyor shown in FIG. 6;

FIG. 13 is a bottom view of the bottom transfer chute of FIG. 6;

FIG. 14 is partial sectional view of the top transfer chute and the upper portion of the spout conveyor shown in FIG. 6 taken along the lines 13—13;

FIG. 28A is a partial front view of the applicator system of FIG. 22 at a first point in time;

DETAILED DESCRIPTION OF THE PREFERRED EMBODIMENTS

1. Overview

Figure 1:
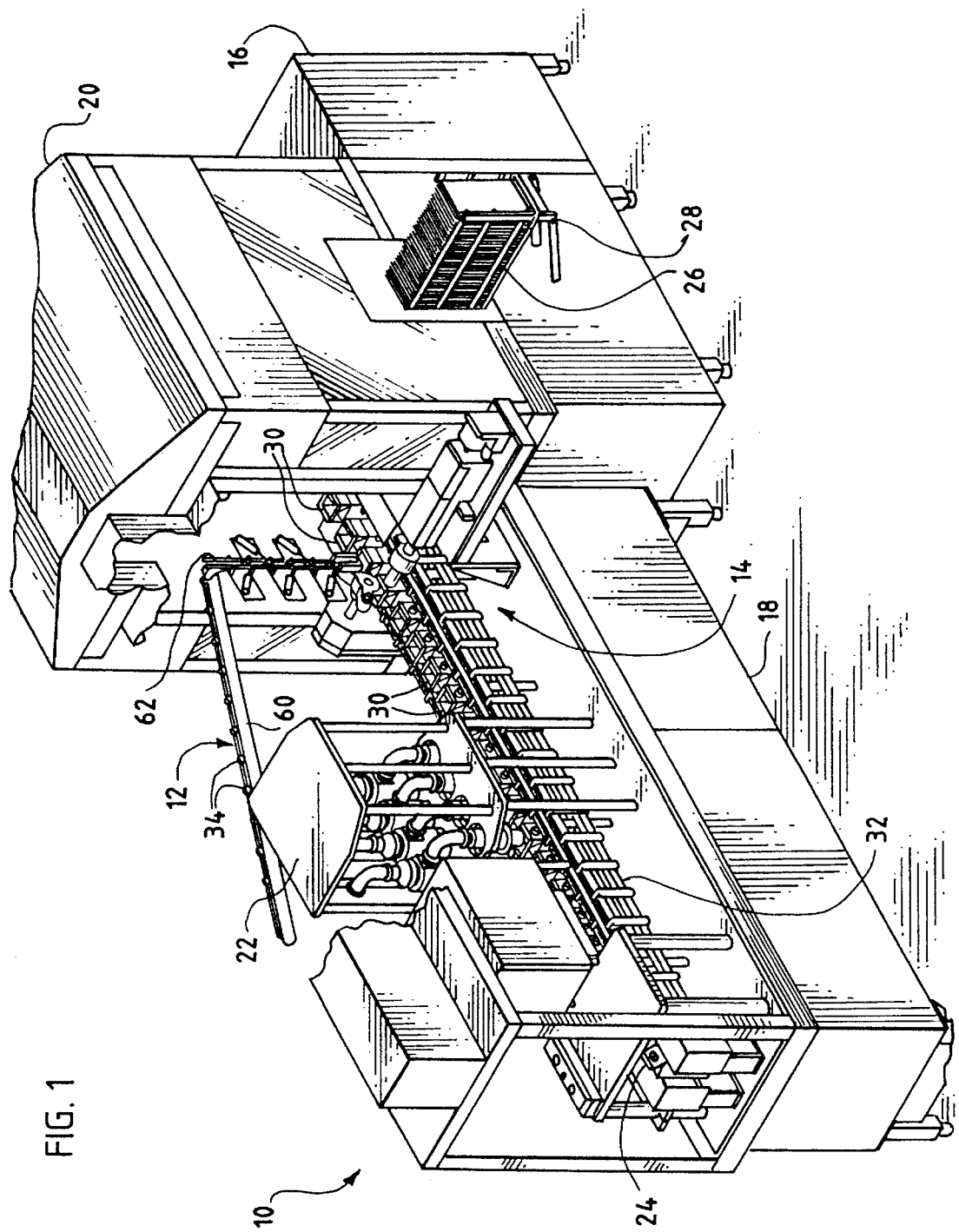
FIG. 1 is a partial perspective view of a carton forming and filling machine which employs an embodiment of the invention.

FIG. 1 is a partial perspective view of a packaging machine 10 which employs a novel spout feed system 12, spout applicator system 14, and spout control system 16. Except for these novel spout systems (which are described below in detail), machine 10 is a conventional carton forming, filling and sealing machine, such as the NiMCO Model 650 manufactured by Nimco Corporation, Crystal Lake, Ill.

Machine 10 includes a housing 18, on which is attached a rotary carton forming station 20, carton filling station 22 and carton sealing station 24. Laminated paperboard carton blanks 26 are loaded into a magazine 28 and fed into rotary carton forming station 20, as is conventional. At rotary carton forming station 20, the paperboard blanks 26 are folded and heat-sealed to create partially formed cartons 30. The structure of these partially formed cartons 30 is discussed below in greater detail.

An indexed, chain-driven carton conveyor 32 is mounted on housing 18, and transfers partially formed cartons 30 from rotary carton forming station 20 to novel spout applicator system 14. At spout applicator system 14, a reclosable spout 34 is attached to each one of partially formed cartons 30. Novel feed system 12 supplies applicator system 14 with large numbers of identical unattached spouts 34, while novel control system 16 synchronizes and controls the operation of feed system 12, applicator system 14 and carton conveyor 32.

Carton conveyor 32 continues past applicator system 14 to carry partially formed cartons 30 (having attached spouts) to filling station 22, where a substance (not shown) such as milk or detergent is dispensed into the partially formed cartons 30 in a conventional manner. Carton conveyor 32 continues past filling station 22 to sealing station 24, where the tops of filled and partially formed cartons 30 are folded and heat-sealed in a conventional manner to form sealed, gabled tops such as found in the common milk carton.

2. Workpieces

Figure 2:
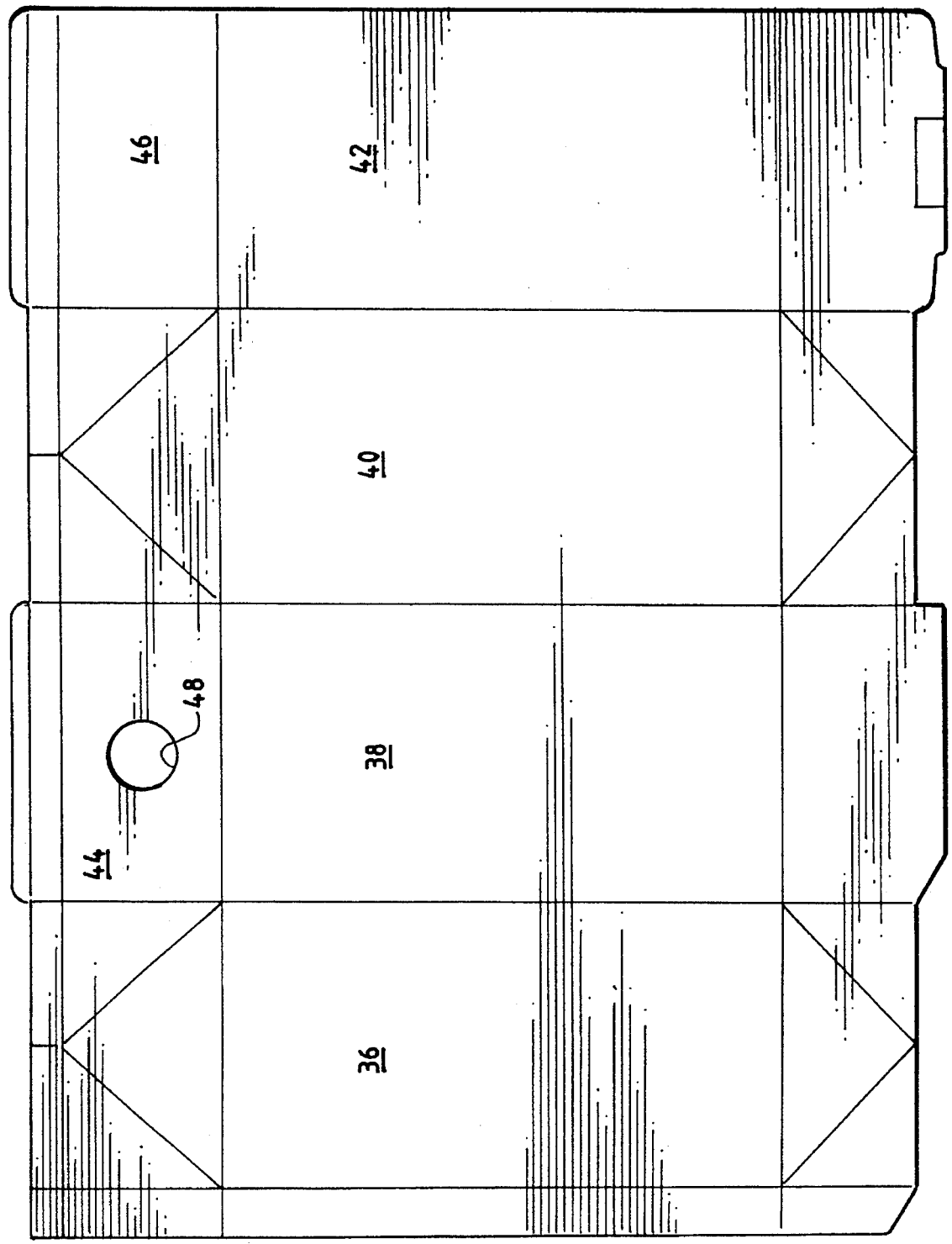
FIG. 2 is a top plan view of one of the paperboard blanks shown in FIG. 1.

As indicated in the preceding section, the overall function of machine 10 is to form, fill and seal paperboard carton blanks 26, and the specific function of novel applicator 14 is to attach a spout 34 to each of partially formed cartons 30. FIG. 2 is a top plan view of one of the paperboard blanks 26. Blank 26 is conventional, and for clarity is shown completely unfolded.

Figure 3:
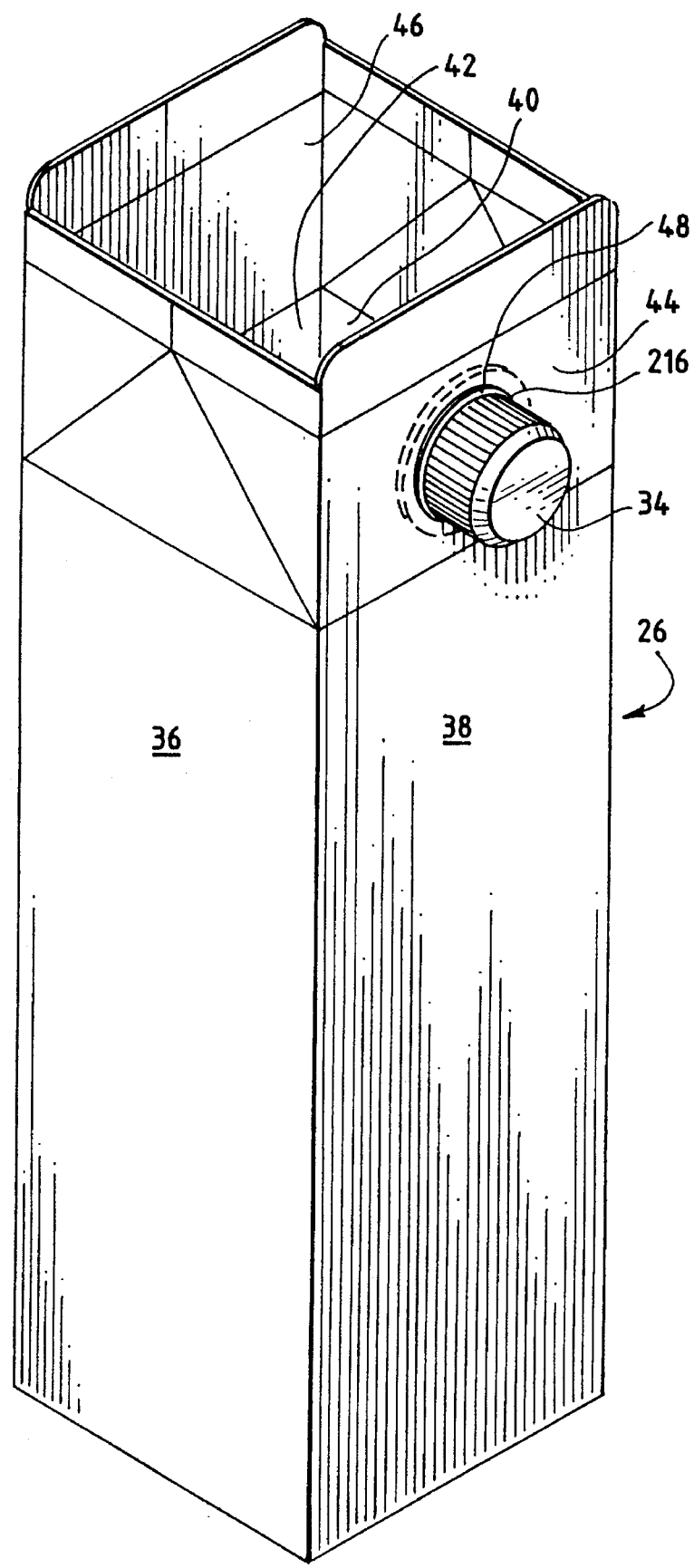
FIG. 3 is a perspective view of one of the partially formed cartons shown in FIG. 1.

As is well known, the paperboard of blank 26 is laminated with heat-sealed plastic. One side of the blank may also be laminated with barrier material such as metal or other material. When folded by rotary carton forming station 20, panels 36, 38, 40 and 42 form sidewalls of partially formed carton 30, as illustrated in FIG. 3. When sealed by sealing station 24, panels 44 and 46 form the angled sides of a gabled top, as illustrated in FIG. 4.

Figure 4:
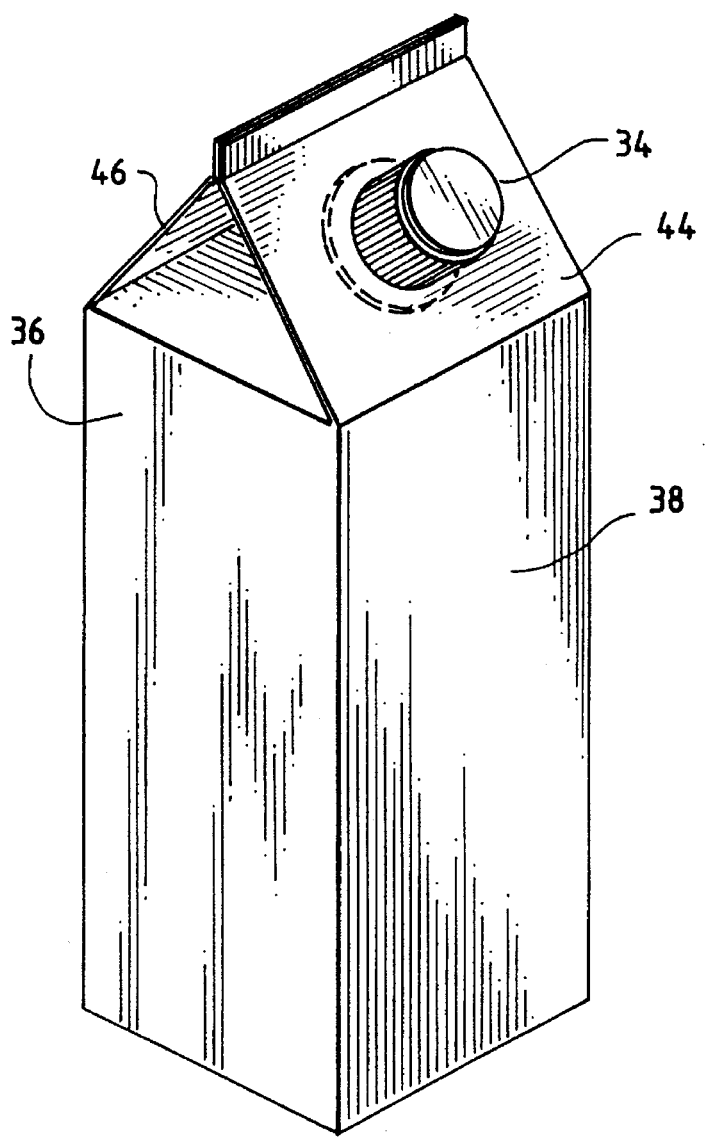
FIG. 4 is a perspective view of one of the completely formed cartons shown in FIG. 1.
Figure 5:
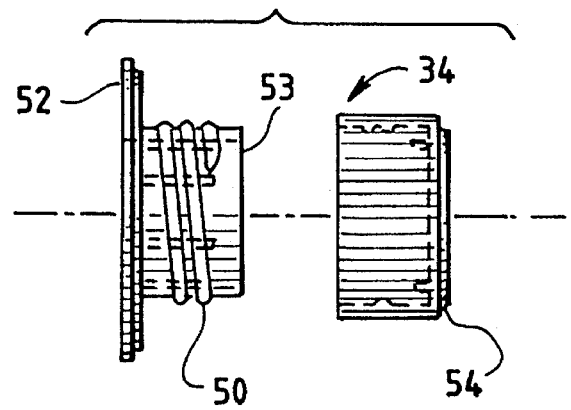
FIG. 5 is an exploded side view of one of the spouts shown in FIG. 1.

Referring to FIGS. 2, 3 and 4, a die cut hole 48 is formed completely through panel 44 for snugly receiving one of spouts 34. FIG. 5 is an exploded side view of one of spouts 34. Each of conventional spouts 34 is a plastic cylinder 50 having a flanged end 52 for mounting to partially formed carton 30. The end 53 of cylinder 50 is threaded for receiving a removable cap 54. As discussed below in greater detail, spout 34 is inserted from the interior of partially formed carton 26 so that threaded end 53 of spout 34 extends outwardly from panel 44, and mounting flange 52 is flush against the interior side of panel 44. It is understood that spout 34 is described by way of example and that the invention also contemplates the use of other types of fitments including hatches and the like.

3. Feed System

Figure 6:
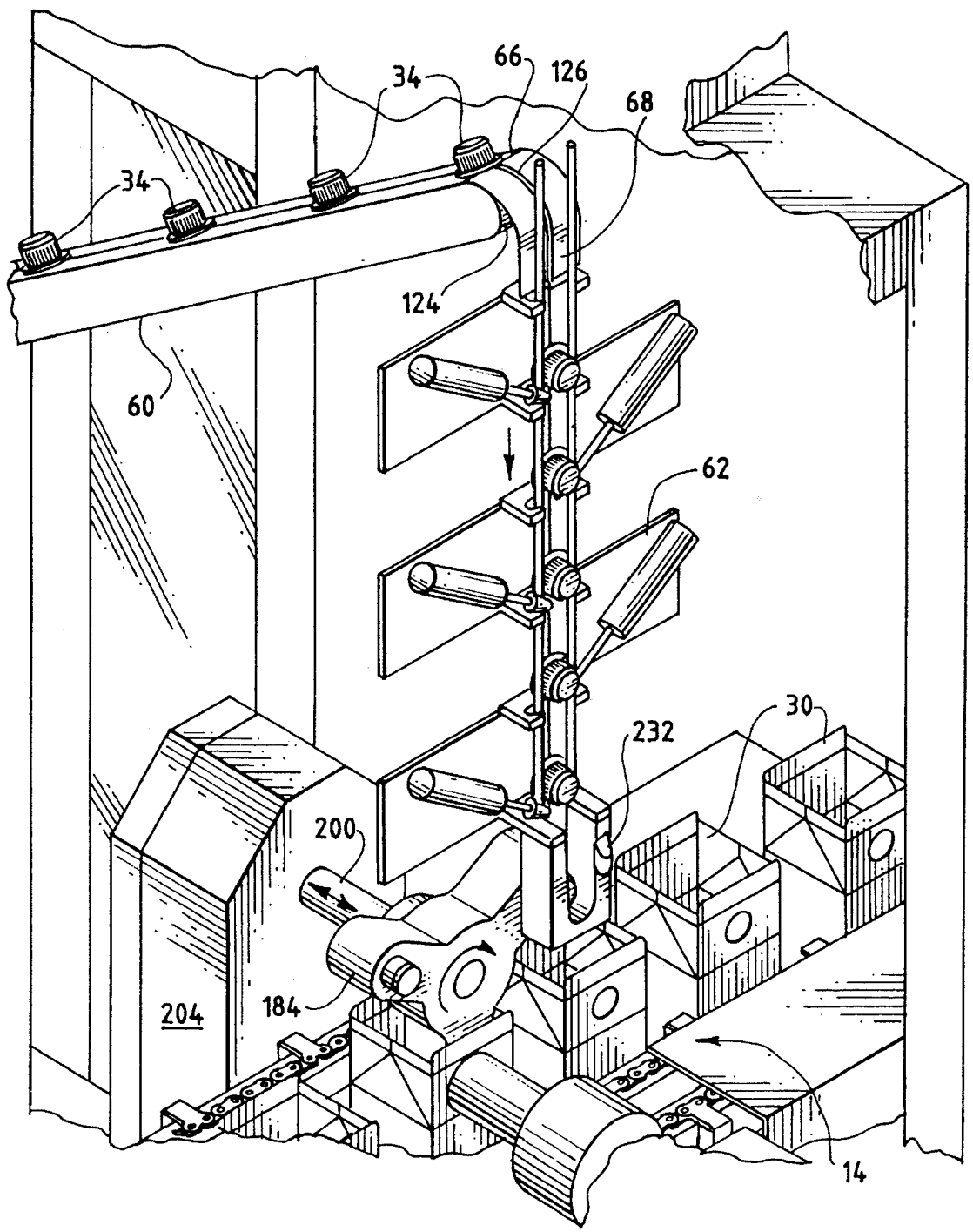
FIG. 6 is an enlarged perspective view of the feed system shown in FIG. 1.
Figure 6A:
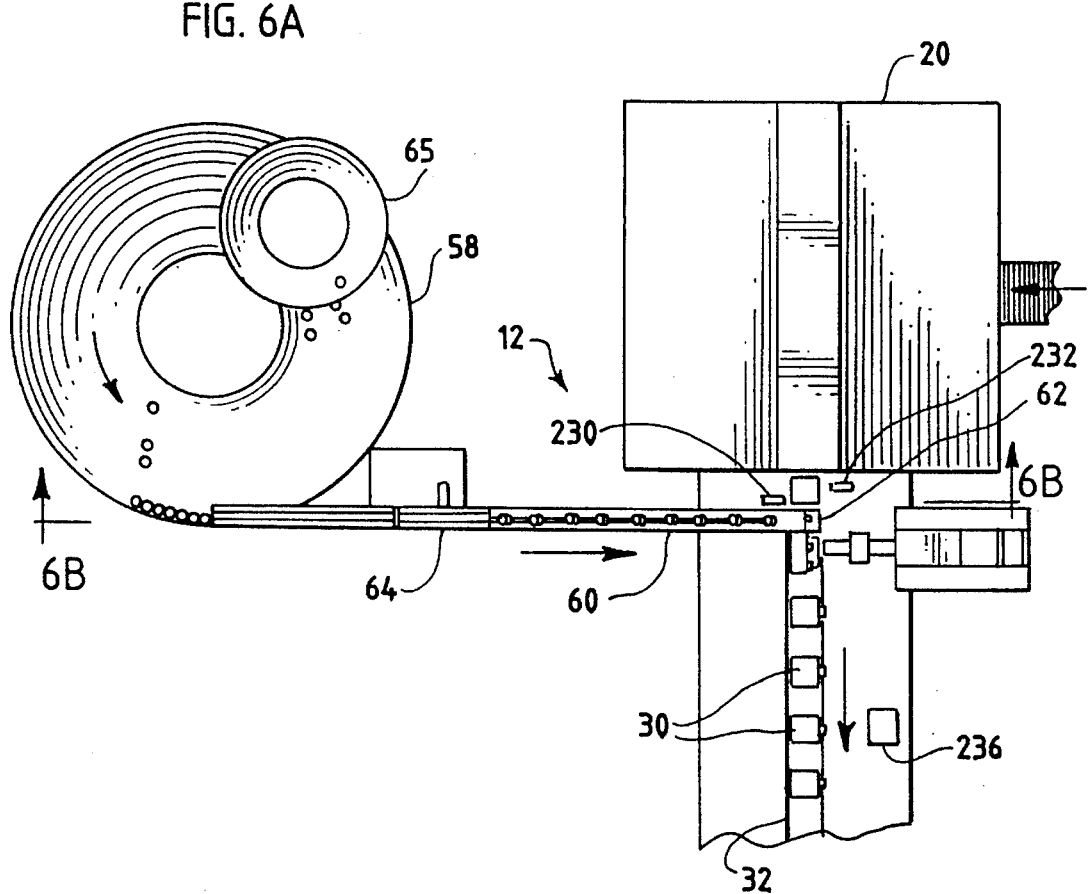
FIG. 6A is a top view of the feed system shown in FIG. 1.
Figure 6B:
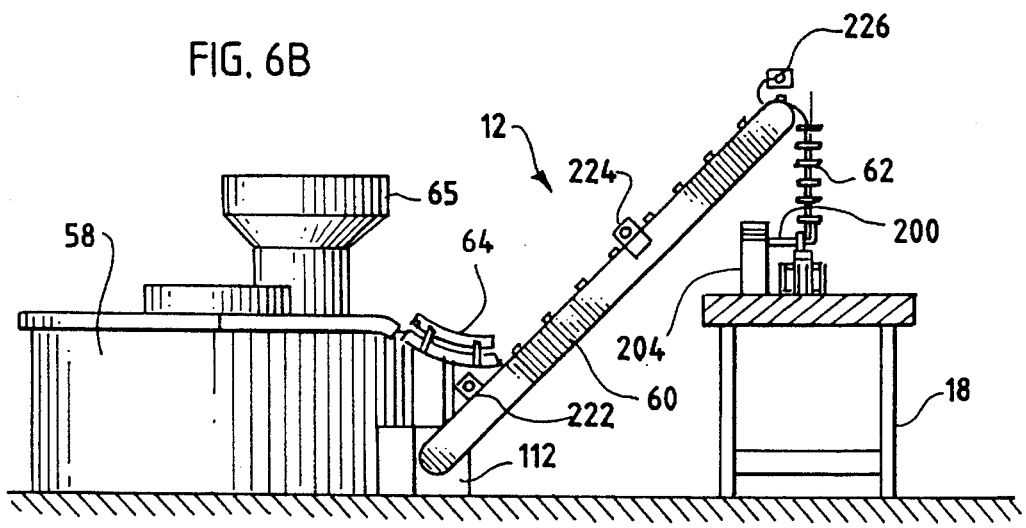
FIG. 6B is a side view of the feed system of FIG. 1.

Referring to FIGS. 1, 6, 6A and 6B, feed system 12 delivers unattached spouts 34 from a conventional vibratory bowl 58 (not shown in FIG. 1) to applicator system 14. For clarity, FIGS. 6A and 6B show only the major features of system 12. Feed system 12 is described below in detail, but generally speaking is comprised of an upwardly sloping spout conveyor 60 and a vertical accumulator 62. Unlike existing systems which utilize elevated feeders, the vibratory bowl 58 is floor mounted. Vibratory bowl 58 delivers separated and oriented spouts 34 to conveyor belt 60 via bottom transfer chute 64, and may be a model such as made by Sikora Automation of Villa Park, Ill. A hopper 65 mounted on top of vibratory bowl 58 feeds vibratory bowl 58 from a bulk supply of spouts 34. Conveyor belt 60 conveys separated and oriented spouts 34 upward to a point 66 above applicator system 14. At point 66, spouts 34 are delivered into the opening 68 of vertical accumulator 62 by top transfer chute 70. Vertical accumulator 62 vertically lowers spouts 34 for delivery to applicator system 14, as described below.

Figure 7:
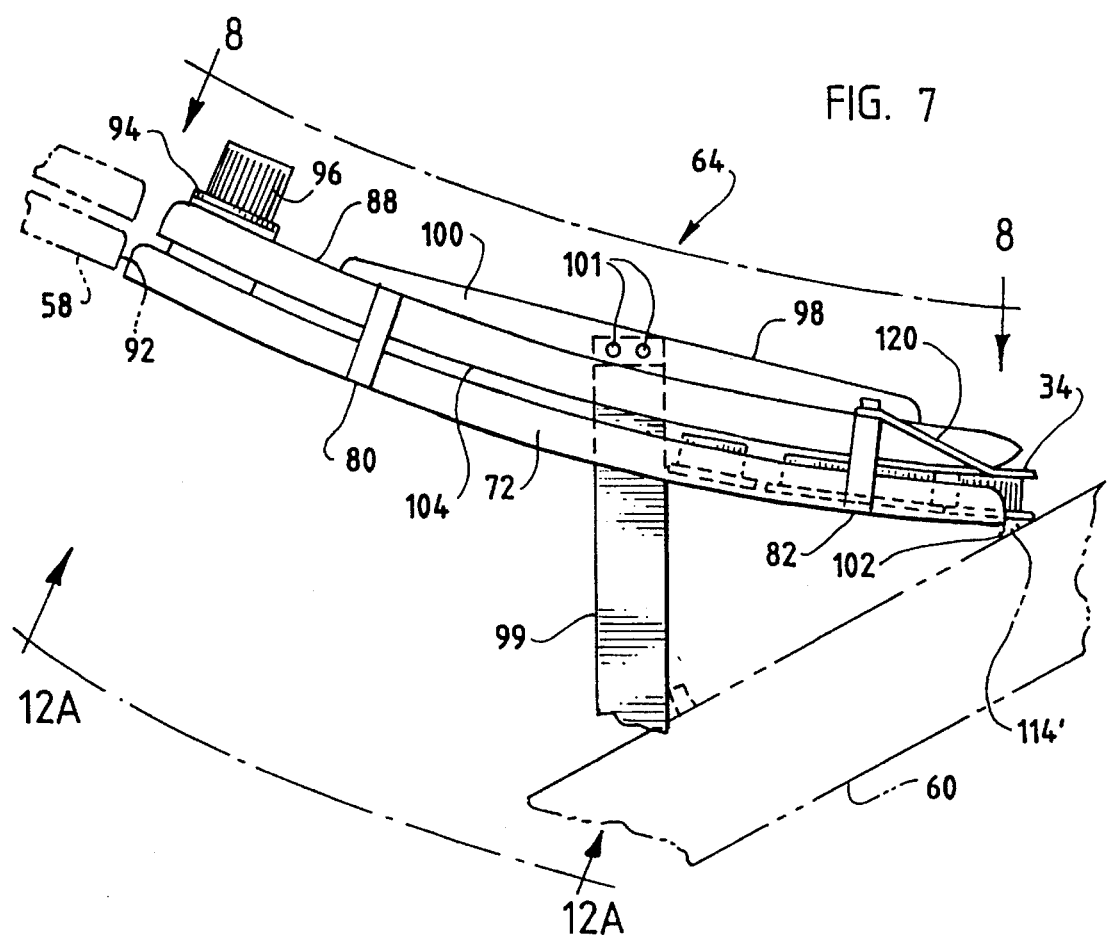
FIG. 7 is a front plan view of the bottom transfer chute of the feed system shown in FIG. 6.
Figure 8:
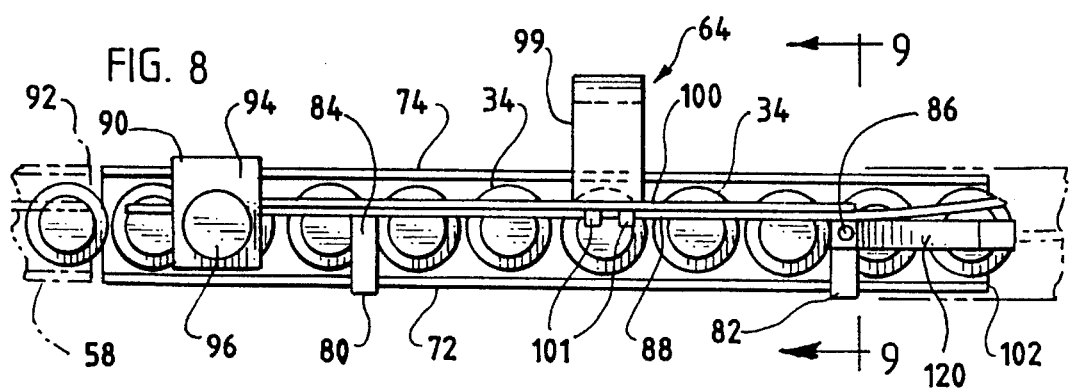
FIG. 8 is a top plan view of the bottom transfer chute of FIG. 7.
Figure 9:
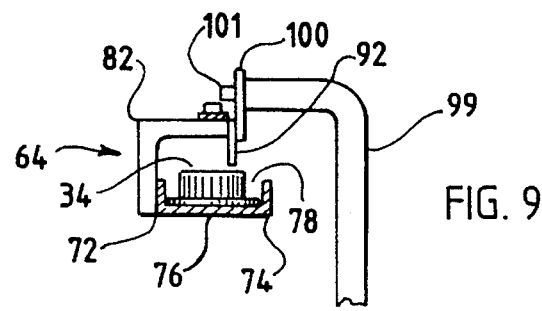
FIG. 9 is a sectional view of the bottom transfer chute shown in FIG. 8 taken along lines 9—9.

The structure and operation of bottom transfer chute 64 is best seen in FIGS. 7–9. Bottom transfer chute 64 is an elongated member having a U-shaped cross section formed by sidewalls 72 and 74 and base 76, which define a channel 78 therebetween for the passage of spouts 34. Although a number of spouts are illustrated in FIGS. 7–9, not all are indicated by a reference numeral. Sidewalls 72 and 74 are shorter than the height of spouts 34 which are positioned in channel 78 by bowl 58 with their respective flanged ends 52 flush against base 76. L-shaped brackets 80 and 82 are mounted on sidewall 72, and have arms 84 and 86, respectively, which extend half way across channel 78. A flat, elongated guide member 88 is conventionally mounted to arms 84 and 86 and extends longitudinally in a direction parallel to that of channel 78. The longitudinal planar surface of guide member 88 is parallel to each of sidewalls 72 and 74.

A third L-shaped bracket 90 extends upwardly from sidewall 74 in close proximity to the output 92 of vibratory bowl 58. Arm 94 of L-shaped bracket 90 extends transversely over channel 78. An aperture (not shown) is provided in arm 94 for mounting an optical sensor 96. As discussed below, optical sensor 96 detects the presence of a spout 34 in channel 78 directly below arm 94. A T-shaped support member 98 having an elongated vertical member 99 and an elongated horizontal member 100 supports bottom transfer chute 64. Vertical member 99 is L-shaped, having an elongated vertical portion extending upwardly from the floor (not shown) and a short horizontal portion extending therefrom, which is conventionally joined to horizontal member 100 by bolts 101. Horizontal member is mounted at both of its longitudinal ends to guide member 88.

Vibratory bowl 58 expels spouts 34 one at a time, having their respective flanged ends 52 facing downward. Bottom transfer chute 64 is connected to the output of vibratory bowl 58 in a conventional manner to receive spouts 34 in channel 78. Because bottom transfer chute 64 slopes slightly downward, the force of gravity, coupled with the expulsive force of vibratory bowl 58, propels spouts 34 along channel 78 toward end 102 which is remote from vibratory bowl 58. Spouts 34 slide along channel 78 with their respective flanged ends 52 flush against base 76. Sidewalls 72 and 74 are separated by a distance just sufficient to permit passage of spouts 34 in single file. Lower edge 104 of guide member 88 follows the curvature of base 76, to provide a constant vertical spacing along channel 78 between guide member 88 and base 76. This spacing is only slightly greater than the height of spouts 34 having their flanged ends 52 down, so that guide member 88 prevents spouts 34 from changing their respective orientations while passing through channel 78.

End 102 of bottom transfer chute 64 terminates approximately 5 millimeters above the surface of spout conveyor 60, which is illustrated most clearly in FIGS. 10 and 11. Conveyor 60 has a chain 108 driven in the direction indicated by the arrow by sprockets 109 (see also FIG. 14). Chain 108 and sprockets 109 are partially enclosed in an elongated box-like enclosure 110. Enclosure 110 extends upwardly at approximately a sixty degree angle from a floor-mounted motor box 112, which drives conveyor 60 in a conventional manner in the direction indicated by the arrows in FIGS. 10 and 11. Fingers 114 spaced at regular intervals (preferably 6 inches) are mounted on and extend outwardly from chain 108 through a longitudinal slot 116 in top wall 118 of enclosure 110. The structure of spout conveyor 60 is described below in connection with top transfer chute 70.

As best seen in FIGS. 7 and 12, end 102 of bottom transfer chute 64 is spaced from top wall 118 of box-like enclosure 110 to allow a spout to protrude from the end 102 of bottom transfer chute 64 onto top wall 118. A spring member 120 is conventionally attached to bracket 82 and firmly holds spout 34 in this fixed position until finger 114' (any one of fingers 114) is carried by conveyor 60 to end 102 of bottom transfer chute 64. Finger 114' passes through slot 122 in base 76 of bottom transfer chute 64 (illustrated in FIG. 13) and engages the interior of spout 34. Finger 114' imparts a force on spout 34 in the direction of conveyor 60 which overcomes the downward force of spring member 120. Consequently, spout 34 is pushed by finger 114' out of bottom transfer chute 64, and along top wall 118 toward upper end 124 (see FIG. 6) of box-like enclosure 110.

As explained below in connection with the control system 16, the delivery of spouts 34 by feed system 12 is synchronized with the operation of applicator system 14 and conveyor belt 60. Control system 16 utilizes optical sensor 96 and other sensors which are discussed in detail below.

Referring to FIG. 14, a partial sectional view is shown of the upper portion of spout conveyor 60 and top transfer chute 70. For clarity, it will be noted that the view is along the longitudinal slot 116 of conveyor 60. Chain 108 is driven by sprockets 109, including sprocket 109' shown in FIG. 14. Fingers 114 extend outwardly from chain 108 at regular intervals to carry spouts 34 upward toward upper end 124 of box-like enclosure 110, in the direction indicated by the arrows in FIG. 14. Although a number of fingers 114 are illustrated in FIG. 14, not all are indicated by a reference numeral.

At end 124, each finger 114 carries its respective spout 34 onto the downwardly extending top transfer chute 70. As illustrated in FIG. 6, top transfer chute includes a slot 126 similar to slot 116 which allows passage of fingers 114 therethrough. It will be noted that the end 124 of enclosure 110 is curved to follow the curvature of sprocket 109'. Top transfer chute 70 is also curved, but the curvature of top transfer chute becomes less pronounced toward its lower end 130.

It will be observed that at point 66 of box enclosure, top transfer chute 70 and top wall 118 are adjacent to each other. Consequently, fingers 114 protrude through slot 126 as they do through slot 116. However, as chain 108 moves around sprocket 109', the curvature of end wall 128 and top transfer chute 70 diverge, with the effect that fingers 114 are withdrawn from slot 126. At a critical point 132 on top transfer chute 70, fingers 114 no longer protrude through slot 126, and the downward slope of top transfer chute 70 is steep enough so that gravitational force propels spouts 34 into the opening 68 of vertical accumulator 62, as described below in greater detail.

Figure 15:
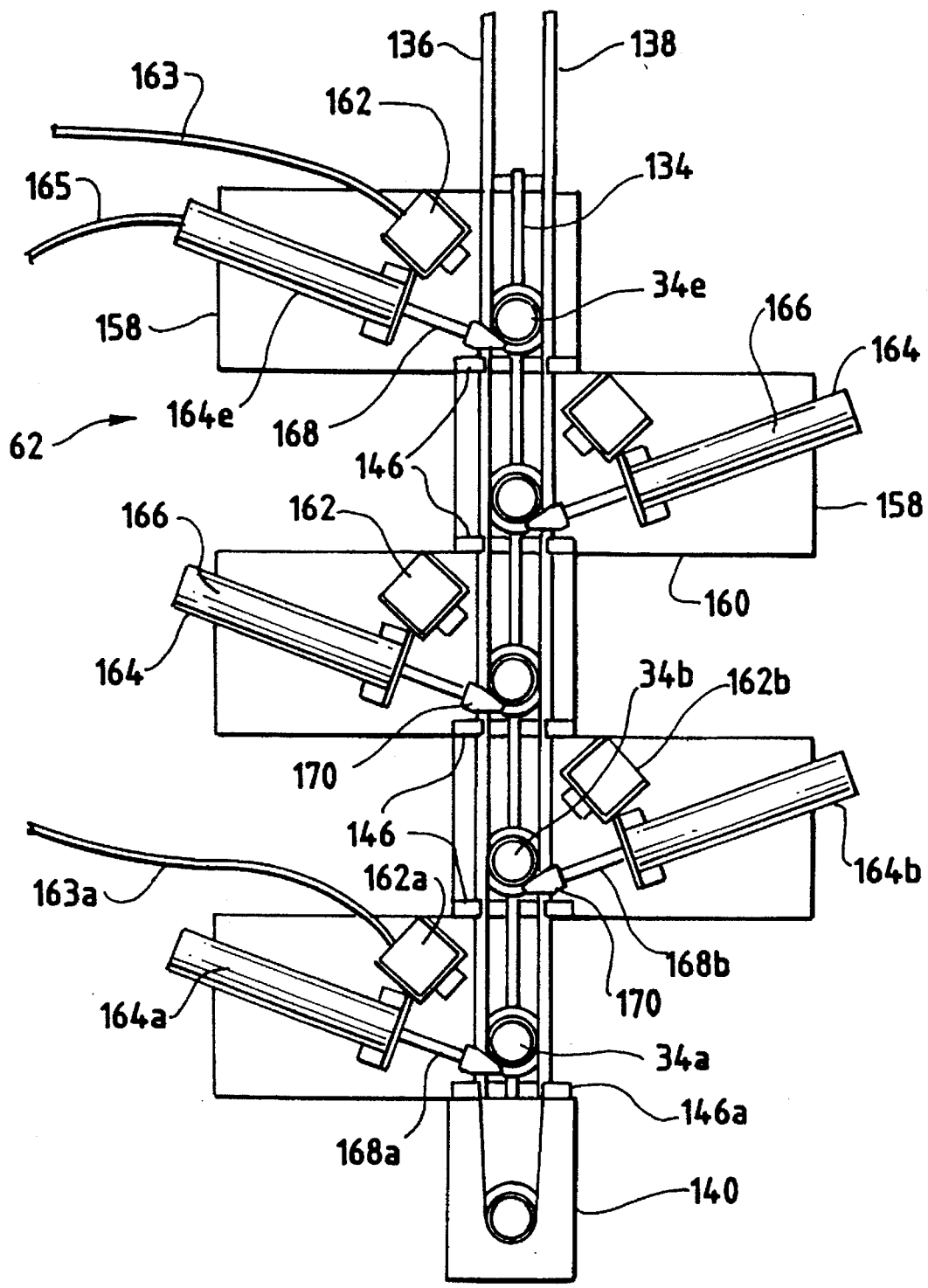
FIG. 15 is a front plan view of the vertical accumulator shown in FIG. 6.
Figure 16:
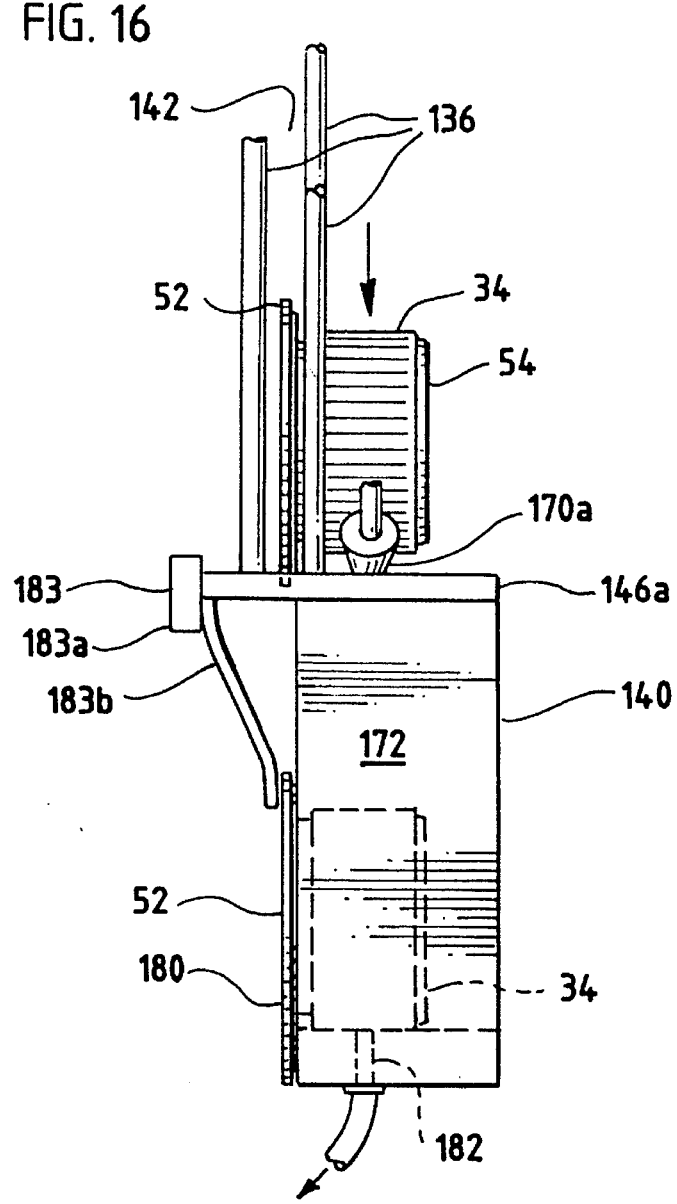
FIG. 16 and 16A is a partial side view of the vertical accumulator shown in FIG. 6.

As best seen in FIGS. 14–16, vertical accumulator 62 includes three vertical metal bars 134, 136 and 138, which extend upward from an escapement 140, which is mounted to housing 18 near applicator system 14. Bar 134 is aligned with slot 116 of conveyor 60, and is approximately four inches shorter than bars 136 and 138. Bars 134, 136 and 138 define therebetween a vertical track or channel 142 along which spouts 34 may descend under the force of gravity. Specifically, bars 136 and 138 are spaced in parallel relation at a distance somewhat greater than the width of cap 54 of spout 34. Viewed from above, bars 134, 136 and 138 form the points of an isosceles triangle. The distance between bar 134 and the imaginary line defined by bars 136 and 138 is sized to force spout 34 to pass with the plane of flange 52 parallel to the imaginary line, which itself is perpendicular to the horizontal direction of conveyor 60.

As discussed above, top transfer chute 70 delivers spouts 34 into the opening 68 of vertical accumulator 62. The spouts 34 are moved by the curvature of top transfer chute 70 so that cylinders 50 are horizontally oriented, and the capped end 54 of each spout 34 faces away from conveyor 60. Bar 134 terminates at (and is in center alignment with) the lower end 130 of top transfer chute 70. Bars 136 and 138, however, extend upwardly past critical point 132, so that as spouts 34 descend along upper transfer chute 70, their capped ends fall between bars 136 and 136, which guide the spouts into the opening 68 of vertical accumulator 62. As spouts 34 enter the vertical accumulator, they are properly oriented for positioning in channel 142, as described in the preceding paragraph.

A plurality of support members 146 are evenly spaced along the length of vertical accumulator 62 beginning at the upper end of bar 134. Referring to FIGS. 14 and 16, each support member 146 is thin, horizontally-oriented plate having a C-shape formed by a cross member and two arms extending therefrom. Each support member 146 is connected to the vertical bars 134, 136 and 138 in any suitable manner such as by welding. Each support member 146 is connected to bar 134 at the midpoint of cross member and connected to bars 136 and 138 by tiny flanges at the ends of arms 150 and 152, respectively.

A thin, rectangular and vertically-oriented mounting plate 158 is attached to each support member 146 along the lower edge 160 of the mounting plate 158. The mounting plates 158 extend to the left and right sides of the vertical accumulator 62 in an alternating pattern. Mounted on each mounting plate 158 is a sensor 162 having wire lead 163 and an pneumatically actuated cylinder 164 having wire lead 165. Wire leads 163 and 165 electronically connect sensors 162 and cylinders 164 to control system 16, which is discussed more fully below. Pneumatically actuated cylinder 164 is a commercially known and is widely available. Alternatively, cylinder 164 may be electrically or hydraulically actuated. Each sensor 162 is a conventional optical sensor. Sensors 162 detect the presence of a cap in close proximity to that one of support members 146 to which their respective mounting plates 158 are attached.

Figure 17:
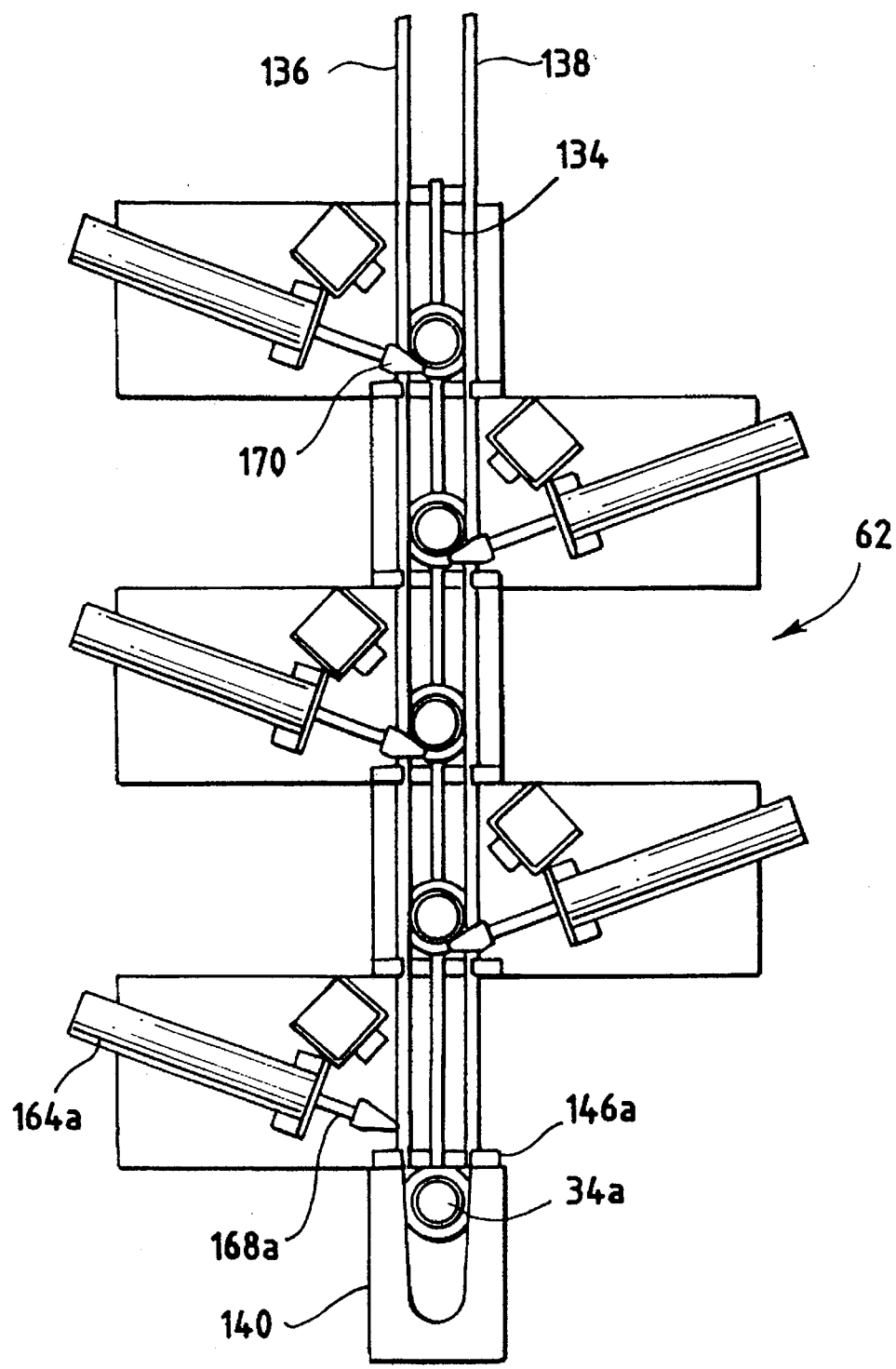
FIG. 17 is a front plan view of the vertical accumulator of FIG. 6 showing one of the retractable support fingers in a retraction position for allowing the downward movement of a spout.
Figure 18:
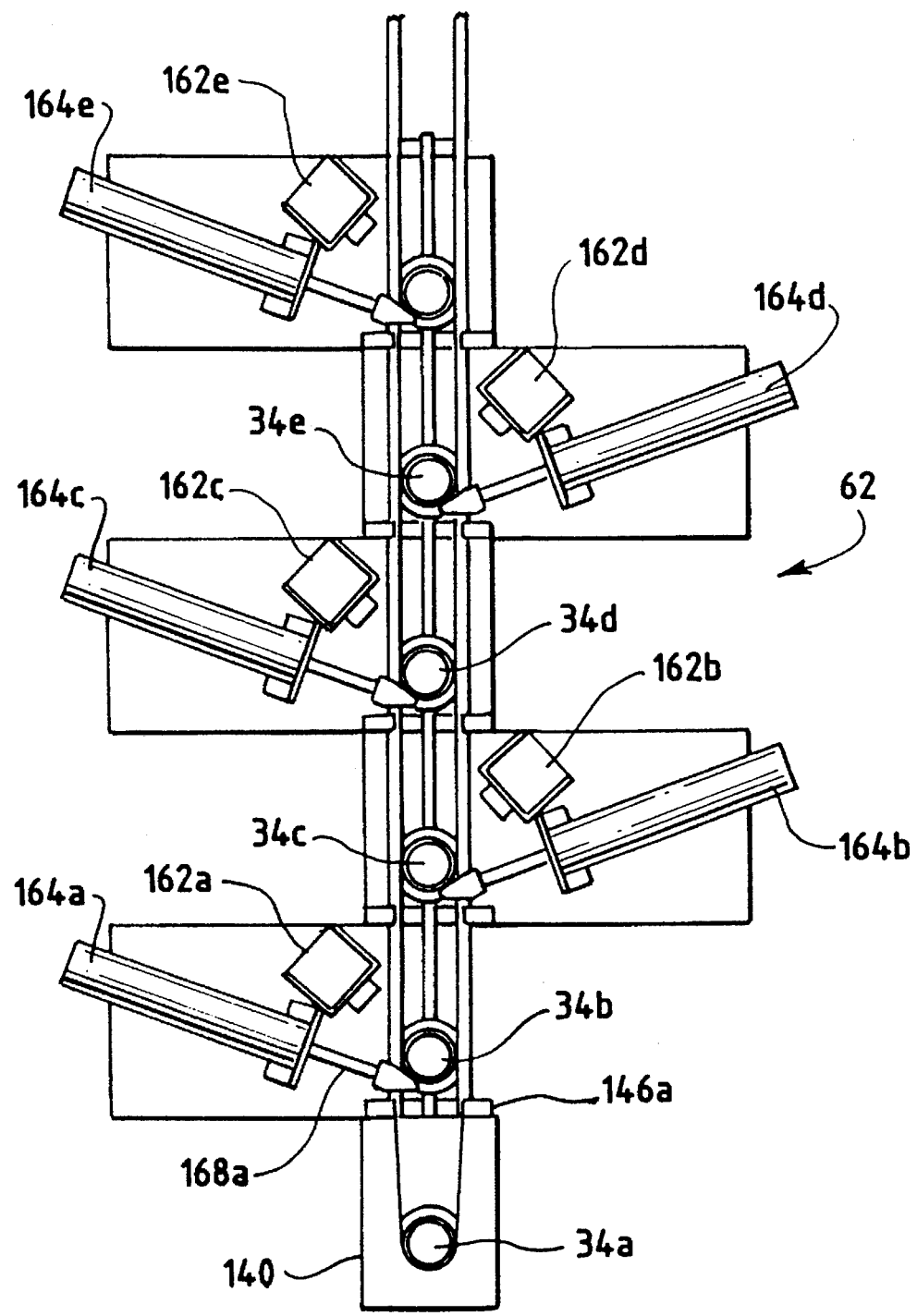
FIG. 18 is a front plan view of the vertical accumulator of FIG. 15 showing the position of spouts after the completion of one vertical feed advancement cycle.

For clarity, a number of support members 146, mounting plates 158, optical sensors 162, pneumatic cylinders 164 and components thereof are illustrated in FIGS. 14, 17 and 18 which are not referred to by a reference numeral. Each pneumatic cylinder 164 has a cylindrical body 166 which is connected to one of mounting plates 158 by any suitable method. A retractable finger 168 extends from the cylindrical body 166 to obstruct the channel 142 formed by the three vertical bars 134, 136, 138. In its fully extended position, retractable finger 168 blocks the passage of spouts 34, forming a trap in close proximity to the adjacent one of support members 146. A pneumatic or other suitable device (not shown) inside cylindrical body 166 is actuated by a signal on line 165 to cause finger 168 to retract. In its retracted position, finger 168 leaves channel 142 unobstructed and allows the free passage of spouts 34. The outwardly extending end of each finger 168 has an arrow-shaped tip 170. The arrow-shaped tip 170 helps prevent fingers 168 from damaging spouts 34 when fingers 168 are extended.

FIG. 15 illustrates each of fingers 168 (specifically, finger 168a) in an extended position, obstructing channel 142 and preventing spouts 34 from descending into escapement 140. At periodic intervals (the timing of which is discussed below in connection with the control system 16), a signal from control system 16 actuates the bottommost cylinder 164a, causing its finger 168a to be retracted, as shown in FIG. 17. In its retracted position, finger 168a does not block channel 142, and spout 34a is free to fall, by force of gravity, into escapement 140.

Finger 168a remains retracted for a period of time just sufficient to allow spout 34a to fall. During this period, the other fingers 168 remain in the extended position. After finger 168a returns to the extended position, its adjacent optical sensor 162a detects that no spout is trapped by finger 168a, and accordingly outputs a "no spout" signal on wire lead 163. As discussed in more detail below, control system 16, upon detection of this "no spout" signal, actuates the cylinder 164b immediately above the cylinder 164a, causing the finger 168b of cylinder 164b to retract, thereby permitting spout 34b to fall until it reaches (and is obstructed by) finger 168a. Finger 168b returns to its extended position, and its adjacent sensor 162b generates a "no spout" signal in response to the absence of spout 34b, and the foregoing process is repeated until the topmost cylinder 164e is actuated causing spout 34e to drop. As described above, spout 34e is replaced by one of the spouts 34 being concurrently deposited into top transfer chute 70 by conveyor 60, as shown in FIG. 14.

In this manner, each finger 168 may be thought of as a rung of a ladder, and during each iteration of the foregoing cycle (the "vertical feed advance cycle"), the cylinder 164 actuation signals propagate up the ladder, with the effect that each of the spouts 34 in vertical accumulator 62 moves down one rung. The originally bottommost spout 34a is placed into escapement 140, and the topmost rung (which is occupied by spout 34e at the outset of the process) is occupied by that one of spouts 34 which has been most recently deposited into transfer chute 70 by conveyor 60. For clarity, FIG. 15 shows the position of spouts 34a, 34b and 34e just prior to the completion of one vertical feed advance cycle, and FIG. 18 shows the new positions of spouts 34a, 34b and 34e immediately after the execution of one advance cycle.

Referring to FIGS. 15 and 19–21, escapement 140 is a block of metal or other suitable material formed in the shape of the letter "U" by two columns 172 and 174 extending perpendicularly from opposing sides of a escapement base 176. Columns 172 and 174 support the underside of the support 146a, the bottommost one of supports 146. It will be noted that each of bars 134, 136 and 138 terminates and is supported by support 146a. Escapement 140 itself is mounted to housing 18 in any suitable manner such as with a bracket (not shown) so as to be in close proximity to the applicator system without interfering with the passage of partially formed cartons 30 along carton conveyor 32.

Figure 20:
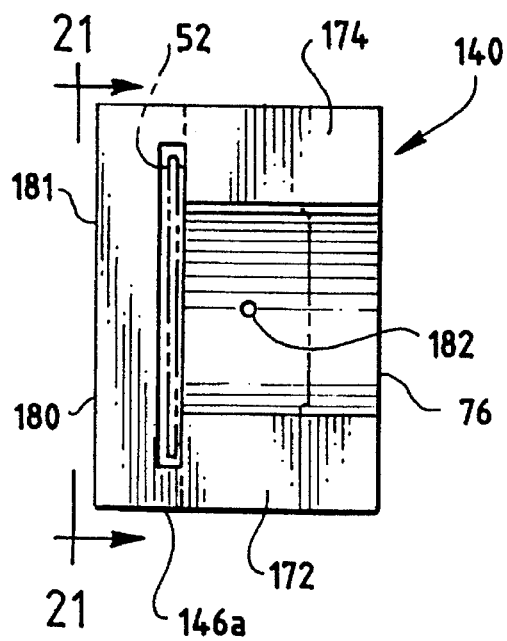
FIG. 20 is a top view of the escapement of FIG. 6.
Figure 21:
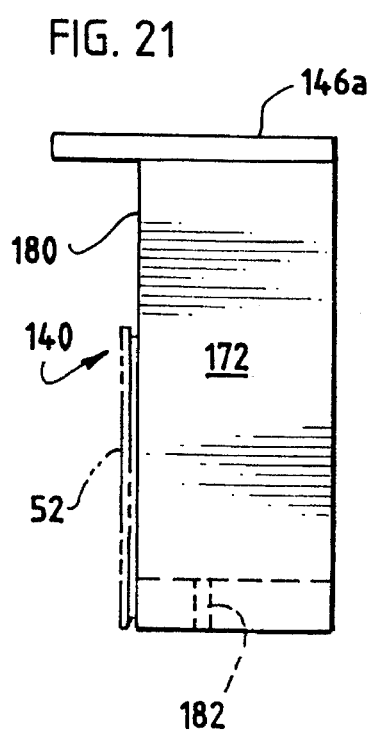
FIG. 21 is a side view of the escapement of FIG. 6.
Figure 19:
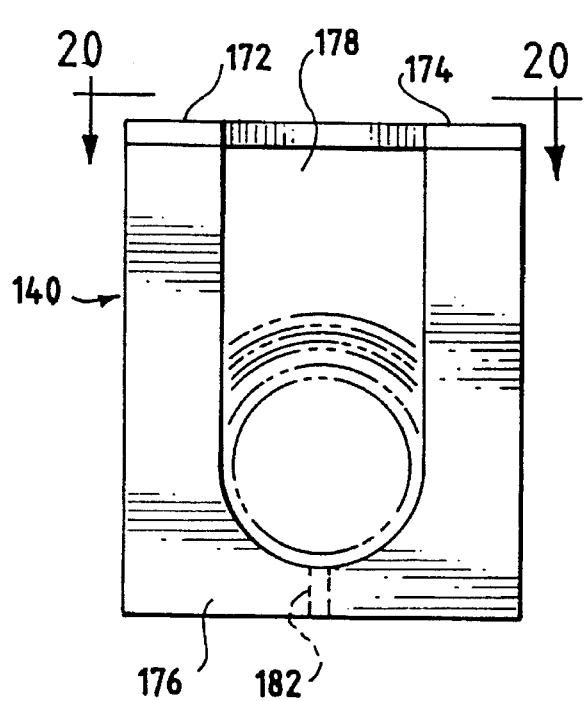
FIG. 19 is a front view of the escapement of FIG. 6.

Referring to FIGS. 19–21, columns 172 and 174 and a base 176 define a slot 178 of escapement 140 into which spouts 34 fall as they are released by bottommost finger 168a. Slot 178 is sized and shaped by the interior contours of columns 172 and 174 and base 176 so that the cap 54 of spout 34 fits snugly between columns 172 and 174, and on top of base 176. Additionally, escapement 140 is carefully positioned with respect to channel 142 of vertical accumulator 62 so that the flanged end 54 of each descending spout 34 extends slightly behind the rearward sides 180 and 181 of columns 172 and 174, respectively, as best seen in FIG. 16. Thus, as horizontally oriented spout cylinder snugly descends through escapement slot 178, the mounting flange 52 will be flush against the rearward sides 180 and 181 of columns 172 and 174, respectively. In this manner, spouts 34 are urged to remain in a fixed orientation in escapement 140.

To ensure that spouts 34 will remain in their proper position while resting at the bottom of encasement slot 178, a conventional vacuum source is provided (not shown) which imparts a vacuum force through an aperture 182 located on the interior side of escapement base 176, as best seen in FIG. 20. Thus, when a spout 34 falls to the bottom of escapement slot 178, it makes contact with aperture 182, against which it is firmly held by the vacuum force. This force prevents spout 34 from bouncing upon impact with the bottom of escapement slot 178.

Figure 16A:
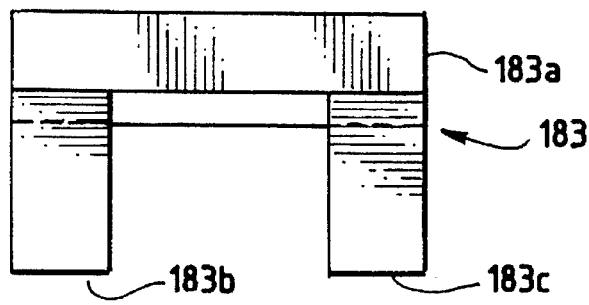

Referring to FIG. 16 and 16A, guide assembly 183 is attached to the rear edge of bottommost support member 168a. Guide assembly 183 guides the mounting flange 52 as spouts 34 descend through slot 178. Guide assembly 183 has a horizontal cross member 183a which is welded or bottled along the backside of support member 146a, as best seen in FIG. 16. Two spaced and parallel tabs 183b and 183c extend downwardly from cross member 183a. Tabs 183b and 183c are bent so that their free ends curve toward the rearward sides 180 and 181, respectively, of escapement 140. Thus, as spout 34 descends into slot 178, tabs 183b and 183c guide mounting flange 54 in much the same manner as vertical bar 136.

4. Applicator System

Figure 22:
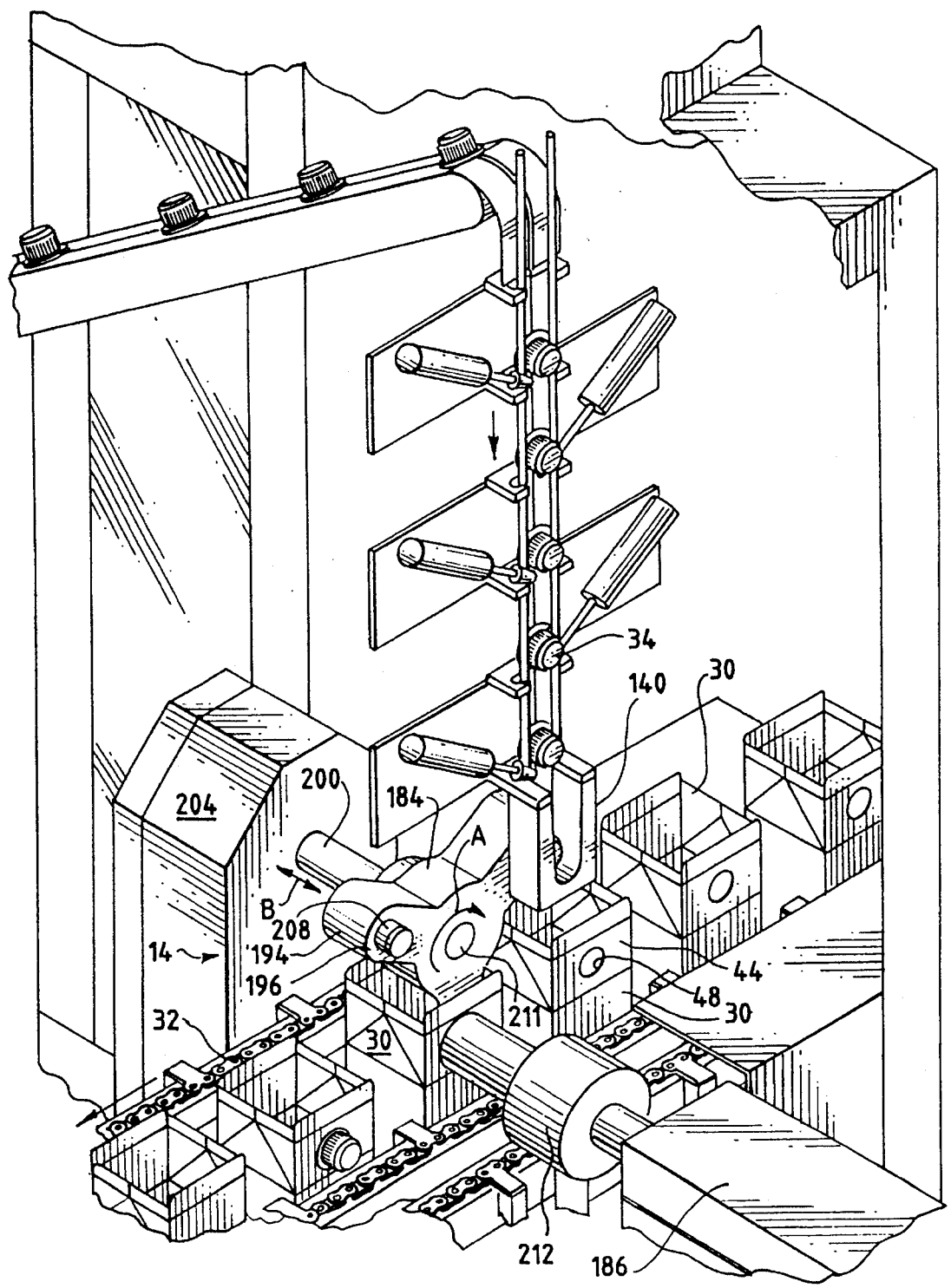
FIG. 22 is an enlarged perspective view of the applicator system of FIG. 1.

As shown in FIGS. 1 and 22, applicator system comprises a rotary anvil 184 and an ultrasonic sealer 186. As explained below in detail, the rotating anvil 184 picks up one of spouts 34 from escapement 140 and transfers it in a rotary motion indicated by the arrow A to the inside of one of partially formed cartons 30. Once inside the carton 30, the anvil 184 moves in a translational motion indicated by the arrow B to insert the spout 34, capped-end first, through the die cut hole 48 and to press mounting flange 52 flush against the interior side of panel 44 of the partially formed carton. Concurrently, the ultrasonic sealer 186 ultra sonically vibrates the periphery of the hole 48, thus heating the heat-sealable plastic laminate adjacent to mounting flange 52, thereby welding the mounting flange to the interior wall of the carton. Rotary anvil 184 must be of sufficient strength to withstand this welding process.

The unique structure and function of the rotary anvil 184 allows the applicator system 14 to insert (from the inside of a carton) and weld spouts 34 in just one operation. Preferably, the applicator system is utilized in cooperation with novel feed system 12 and control system 16. To better understand the operation of applicator system 14, the structure and function of its components are discussed below in detail.

Figure 23:
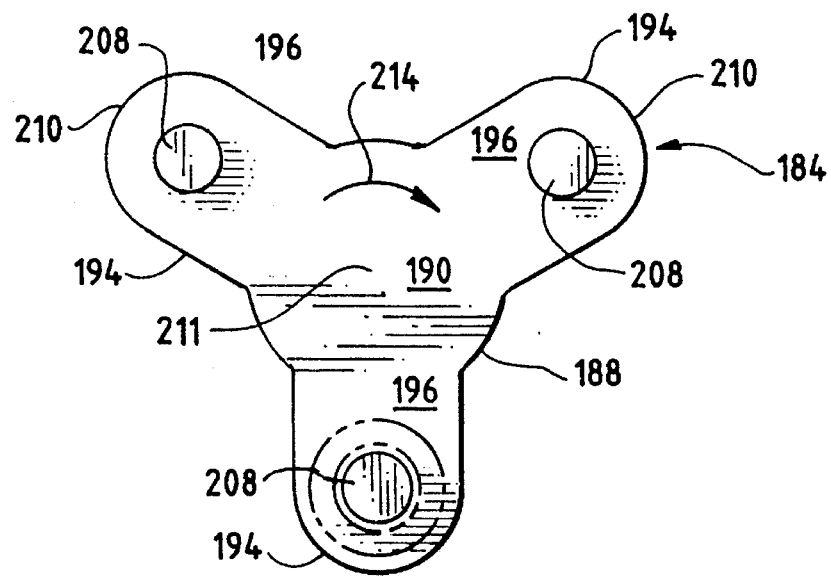
FIG. 23 is a front view of the rotary anvil of FIG. 22.
Figure 24:
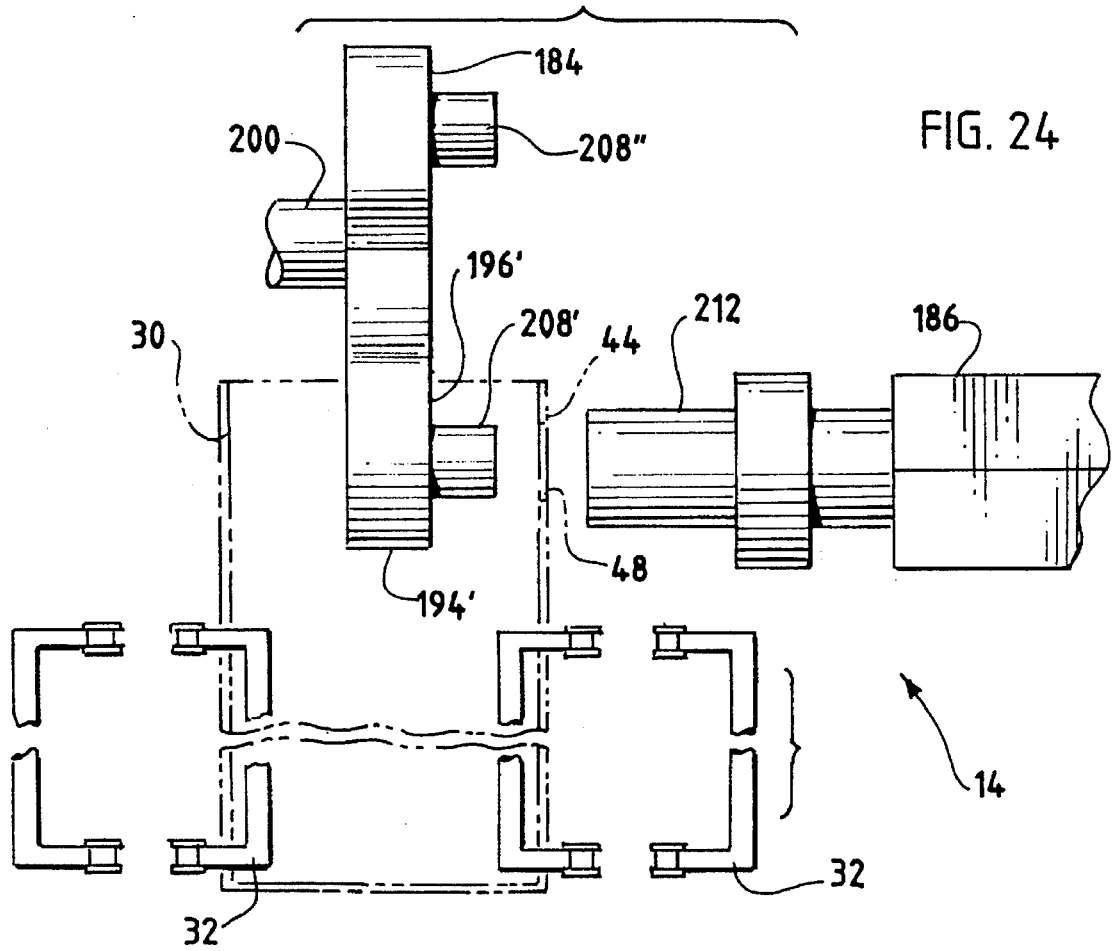
FIG. 24 is a side view of the applicator system of FIG. 22.

Referring to FIGS. 23 and 24, rotary anvil 184 is of metal and consists of a central disk portion 188 having front and rear parallel planar faces 190 and 192, respectively. Preferably, three lobes 194 extend radially at 120° increments from disk 188. As will be explained, more or fewer lobes 194 may be used. Each lobe is of a width somewhat larger than the diameter of mounting flange 52 of spout 34. Each lobe has a front face 196 which is coplanar with the front face 190 of central disk portion 188.

Figure 25:
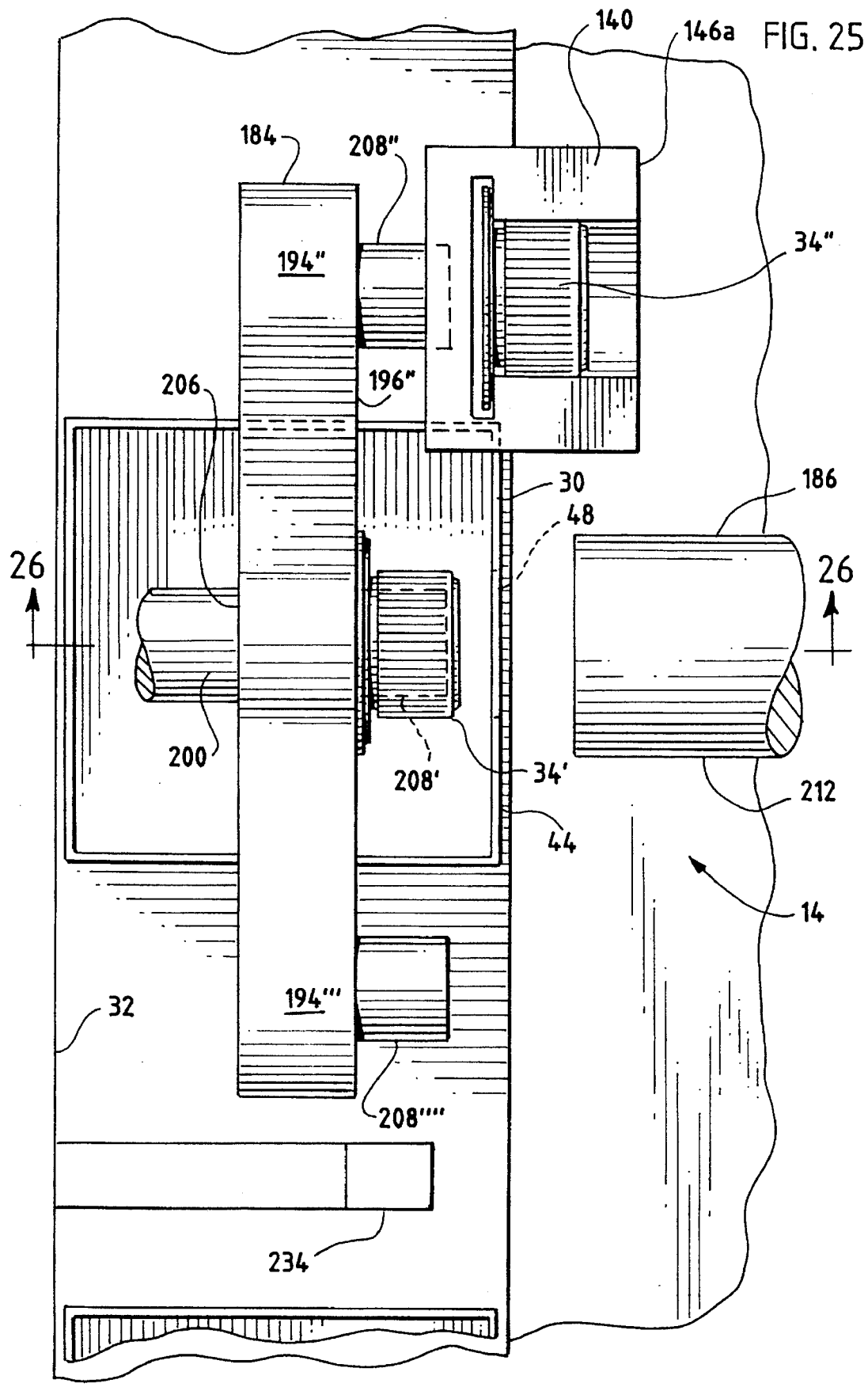
FIG. 25 is a partial top view of the applicator system of FIG. 22.

Rotary anvil 184 is mounted for rotational and axial translational motion on a shaft 200, which is centrally mounted on the rear side 202 of central disk portion 188 as best seen in FIGS. 24 and 25. Shaft 200 is mounted in a conventional drive source 204 suitable for imparting periodic rotational and translational motion to the anvil 184. For example, drive source may be mechanical, pneumatic or hydraulic. In the illustrated embodiment, drive source 204 is mechanical with respect to rotational motion and pneumatic with respect to translational motion. Preferably, drive source 204 is mounted to housing 18 on one side of carton conveyor 32 so that the end 206 of shaft 200 remote from the drive source 204 extends transversely over carton conveyor 32, and at a height above conveyor 32 so as not to interfere with the passing of partially formed cartons 30. Because end 206 of shaft 200 extends only about half way across carton conveyor 32, the anvil 184 (which is mounted on end 206) is suspended above the partially formed cartons 30 passing past shaft 200 on conveyor 32. Shaft 200 imparts axial translational motion to anvil 184 by moving toward and away from conveyor 32 to insertion and retraction positions respectively. Normally, shaft 200 remains in the retraction position.

Referring to FIGS. 22–24, a mandrel 208 extends perpendicularly from the front face 196 of each lobe 194. Preferably, each mandrel 208 is located near the tip 210 of its respective lobe, at exactly the same distance from the center point 211 of central disk portion 188. Each mandrel 208 is cylindrical in shape, and is of a length and diameter so as to snugly fit inside the cylindrical portion 50 of each spout 34. For clarity, lobes 194 are referred to in FIGS. 24 and 25 as lobes 194', 194", and 194''', and their respective mandrels are referred to as 208', 208", and 208'''.

Ultrasonic sealer 186 is a known, commercially available device. It is mounted to housing 18 in any suitable manner so that it is positioned on the side of conveyor 32 opposite drive source 204. Ultrasonic sealer 186 includes a hollow cylindrical horn 212 in a horizontal orientation. The longitudinal axis of horn 212 is perpendicular to the plane of anvil front face 214. Horn 212 is capable of translational motion toward and away from anvil 184 by means of a conventional drive source (not shown).

Of importance is the timing and positioning of the rotary anvil 184, the ultrasonic sealer 186, the partially formed cartons 30, and the escapement 140 (discussed above in connection with the feed system 12). Reference is made to FIG. 25, which is a top view of the applicator 14 showing partially formed carton 30 directly under anvil 184. It will be appreciated from the foregoing description that the rotary anvil 184 is suspended above conveyor 144 with the front face 196 of each lobe 194 parallel to the direction of carton conveyor 32 and facing toward the ultrasonic horn 212. In the illustrated embodiment, carton conveyor 32 is moving partially formed cartons 30 toward the filling station 22 so that the panel 44 containing hole 48 is also parallel to the front face 196 of each lobe 194.

As mentioned, conveyor 32 is conventionally indexed to periodically move cartons 30 a predetermined distance (preferably 6 inches). With each index of the conveyor 32, the partially formed cartons 30 are sequentially moved into a position centered directly under anvil 184 as shown in FIG. 22. Concurrently with the indexed movement of the conveyor 32, the shaft 200 imparts 120 degrees of rotational motion (indicated by the arrow 214 in FIG. 24) to the anvil 184. The anvil 184 is mounted on shaft 200 so that this rotational motion leaves the anvil 184 in a position (the "anvil operating position") with one lobe 194 extending directly vertically downward, and the other two lobes 194 extending outward, as shown in FIG. 23.

After the conveyor 32 has been indexed and anvil 184 has been rotated 120 degrees to the next anvil operating position, the downwardly extending one of lobes 194 will be positioned in the interior of a partially formed carton 34, as best seen in FIG. 24. At this point in time, shaft 200 remains in its retracted position. The length of shaft 200 is selected so that the front face 196' of downwardly extending lobe 194' is suspended in parallel spaced relation to panel 44, as best seen in FIG. 24. Preferably, mandrel 208' (and the other mandrels 208) are spaced from the center point 211 so that they are exactly aligned for insertion into hole 48 when their respective lobes 194 are inside the cartons 30, as indicated by FIGS. 24 and 25.

Referring to FIGS. 22 and 25, it will be observed that escapement 60 is positioned so that when anvil 184 is in the anvil operating position (illustrated in FIG. 23), one of the lobes 194 (such as lobe 194") extends behind the escapement 140 so that its mandrel 208" is vertically and horizontally aligned for insertion into the cylinder 50 of that one of spouts 34 which has been dropped into escapement 60 (for convenience designated in FIG. 25 as spout 34").

Thus, the rotary anvil 184 initially has one mandrel 208" aligned with one of the unattached spouts 34 in escapement 140, and another mandrel 208' aligned with the hole 48 in panel 44 of the partially formed carton 30 which the carton conveyor 32 has moved underneath the anvil 184. In a manner described below, one of unattached spouts 34 (specifically spout 34') has already been placed on mandrel 208'.

Next, shaft 200 moves into its insertion position, imparting an axial translational movement to anvil 184. This translational motion causes mandrel 208" to be inserted into spout 34" resting in escapement 140. Mandrels 208 are sized to fit snugly inside the cylinders 50 of spouts 34". Thus, when mandrel 208" is inserted into spout 34", it engages the interior walls or the spout 34" with a friction of force fit. Because mounting flange 52 is flush against the rearward walls 180 and 181 of escapement 140, spout 34" remains stationery against this force, and mandrel 208" is inserted therein by the aforementioned translational movement.

Figure 27:
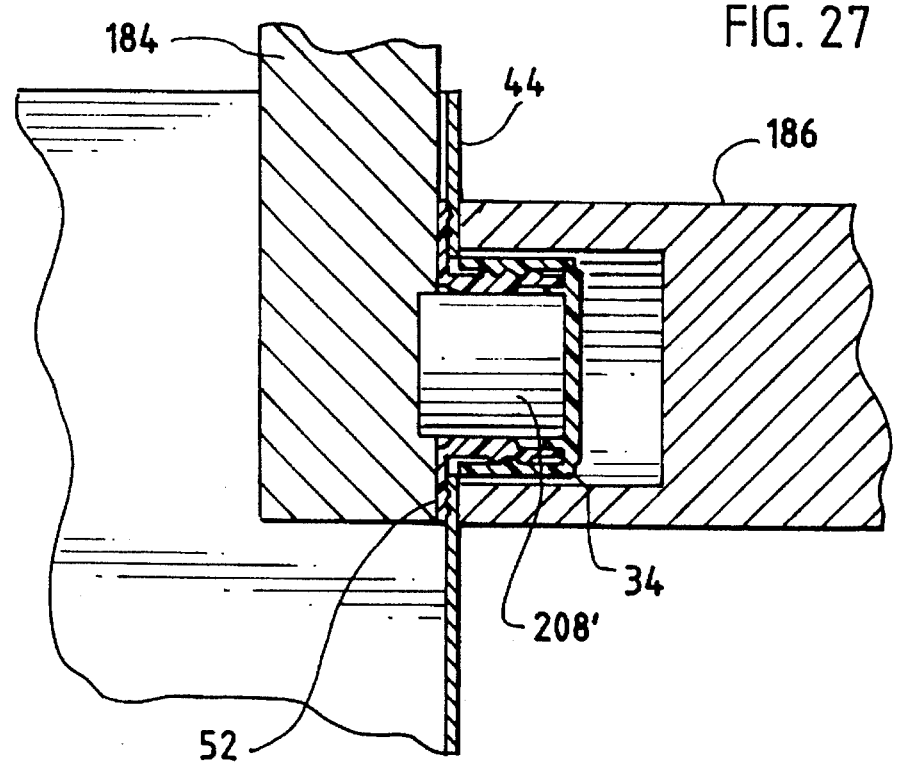
FIG. 27 is the partial sectional view of FIG. 26 at a second point in time.

Simultaneously, mandrel 208' (and the spout 34' into which mandrel 208' has been inserted) is inserted into hole 48, as best seen in FIG. 27. Thus, the capped end 54 of spout 34 is inserted through the hole 48 and extends outwardly from panel 44. The aforementioned translational motion moves lobe 194' forward so that its front surface 196' pushes mounting flange 52 flush against the interior side of carton panel 44.

While shaft 200 remains in this insertion position, ultrasonic sealer 186 moves an ultrasonic welding head 212 toward carton 30 to engage a doughnut-shaped region 216 of panel 44 (See FIG. 3) which surrounds hole 48 and superimposes mounting flange 52. In a well-known welding process, welding head 212 then ultrasonically vibrates region 216, thus heating the heat-sealable plastic laminate adjacent to the mounting flange 52, thereby welding the mounting flange to the interior side of panel 44.

Figure 26:
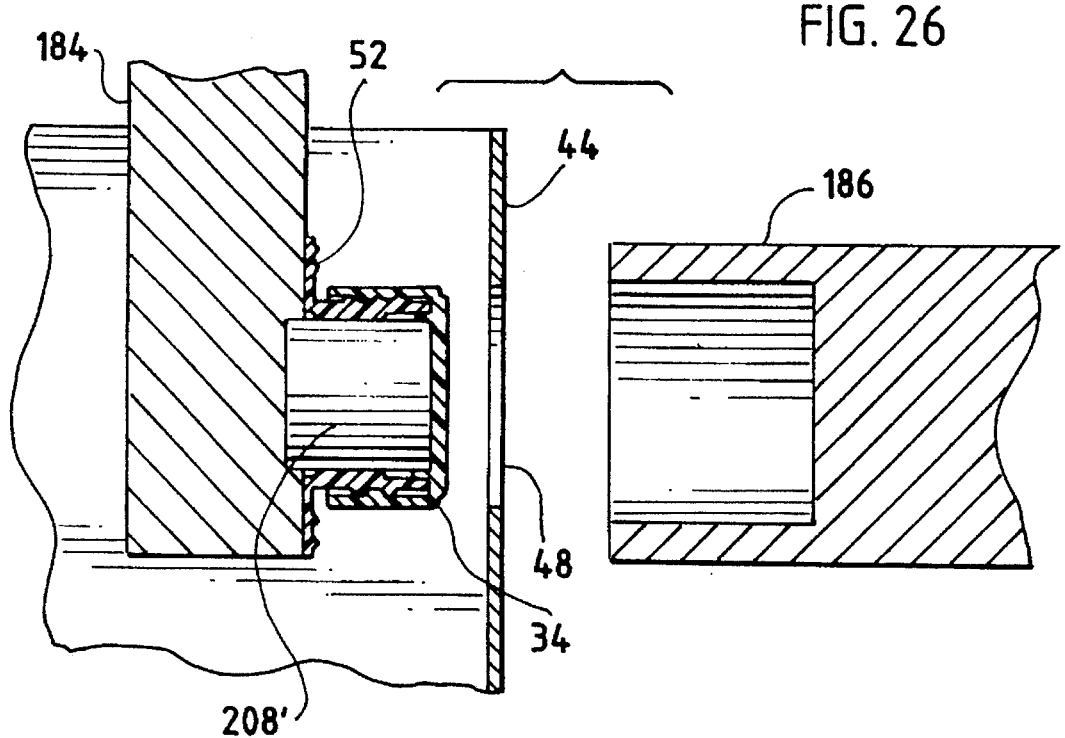
FIG. 26 is a partial sectional view of the applicator system of FIG. 25 taken along the lines 26—26 at a first point in time.

Upon completion of the welding process, the ultrasonic sealer 186 retracts to its original position, as show in FIG. 26. At the same time, shaft 200 returns to its original retracted position, thereby causing anvil 184 to move translationly away from carton panel 44 and escapement 140. As the anvil so moves, mandrel 208" is retracted from escapement 140 and, simultaneously, mandrel 208' is retracted from hole 48.

As mandrel 208" is retracted from escapement 140, the friction between the interior wall of spout 34" and the close-fitting mandrel 208" overcomes the vacuum force imparted through aperture 182, and spout 34" is completely withdrawn from escapement 140 by mandrel 208". Thus, at the completion of the retraction, spout 34" is placed firmly on mandrel 208". It will be observed that the next time anvil 184 is rotated by shaft 200, mandrel 208" (and spout 34") will be placed inside one of cartons 30 in the manner described above in connection with mandrel 208'.

While mandrel 208" is extracting spout 34" from the escapement 140, mandrel 208' is withdrawing from the hole 48. Notwithstanding the presence of similar friction forces acting on spout 34', spout 34' remains in hole 48, permanently attached by virtue of the spout's welded mounting flange 52. In this manner, the spout 34' has been effectively attached to panel 44 of carton 30.

The foregoing process is repeated each time carton conveyor 32 is indexed to advance a partially formed carton 30 to anvil 184. Preferably, the operation of anvil 184, vertical accumulator 68, ultrasonic sealer 186 and conveyor 32 are all synchronized. Person skilled in the art will be aware of numerous techniques for achieving this, and the present invention contemplates the use of any suitable technique. The preferred technique is discussed below in connection with control system 16.

Figure 28B:
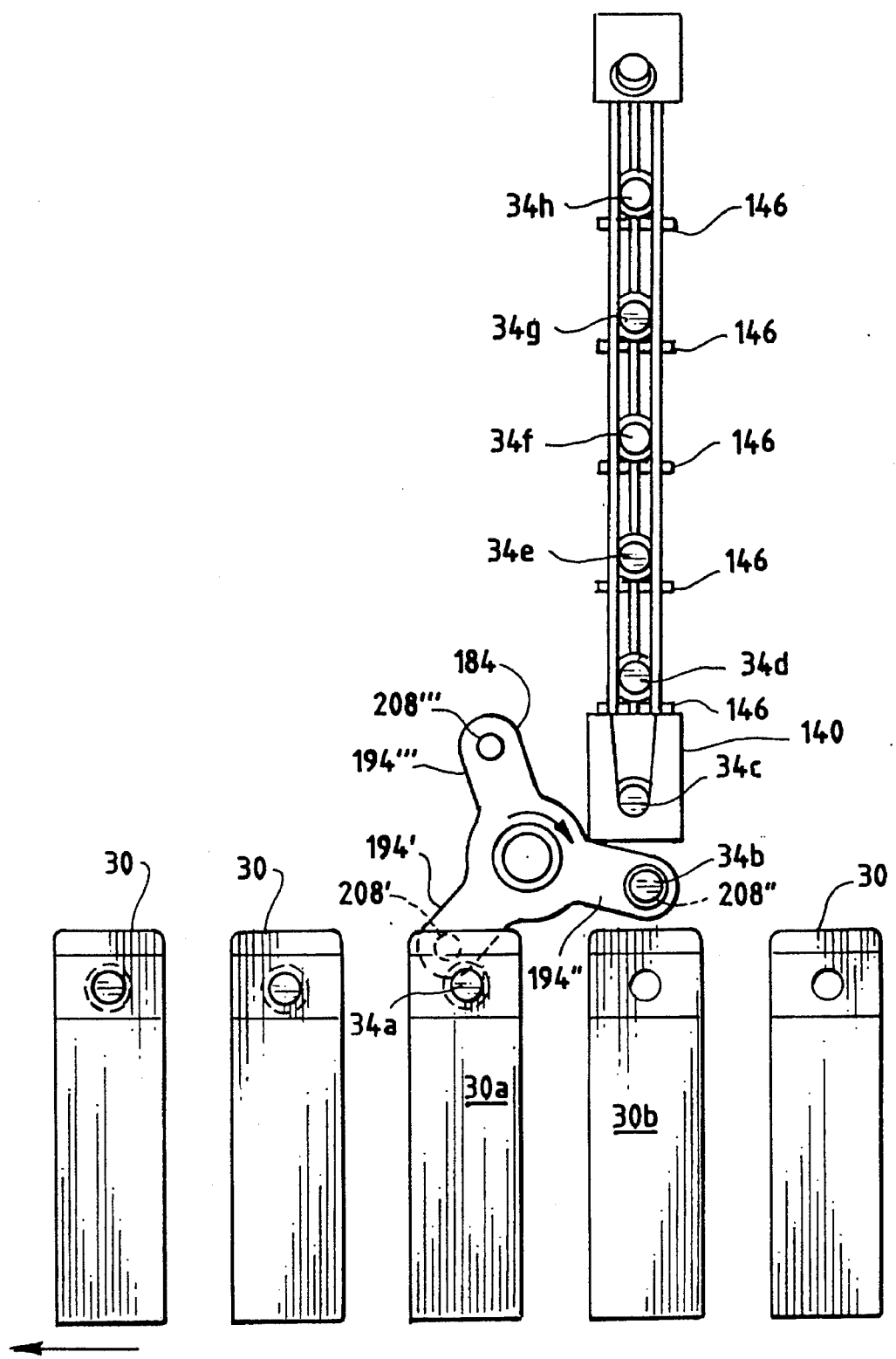
FIG. 28B is a partial front view of the applicator system of FIG. 22 at a second point in time.
Figure 28C:
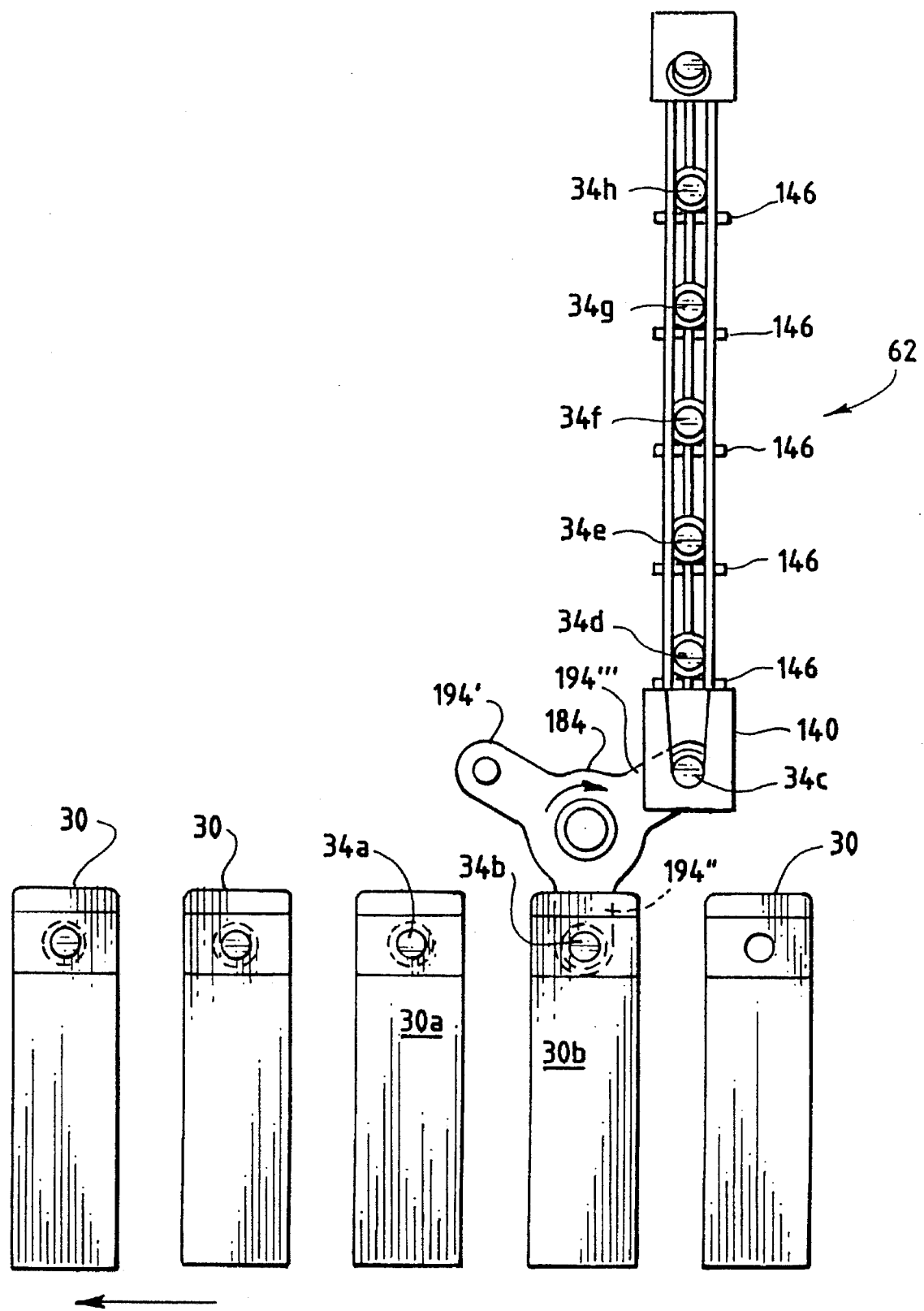
FIG. 28C is a partial front view of the applicator system of FIG. 22 at a third point in time.

The foregoing description of applicator system 14 has focused on the operation of anvil 184 during the time period between conveyor 32 indexing (i.e., while conveyor 32 is stationary). To better understand the operation of applicator system 14, reference is now made to FIGS. 28A through 28C, which diagram the operation of anvil 184 during conveyor 32 indexing (i.e., while conveyor 32 is moving from one indexed position to the next). It is understood that the diagrams of FIGS. 28A–28C are simplified for the purpose of showing timing (as opposed to structural) aspects of the invention. In FIG. 28A, anvil 184 is in the anvil operating position with lobe 194' extending downward into a standard one quart carton 30a, and lobe 194" extending upward to engage escapement 140. Spout 34a has just been welded (as described above) to partially formed standard one quart carton 30a. Shaft 200 has retracted, causing anvil 184 to retract from welded spout 34a and escapement 140. As described above, unattached spout 34b has been withdrawn from the escapement and is now firmly engaged by mandrel 208".

In FIG. 28B, the carton conveyor begins to index partially formed cartons forward in the direction indicated by the arrow. Preferably, during this movement, the conveyor moves each carton 30 about 4.5 inches horizontally. While the conveyor is moving, shaft 200 causes anvil 184 to rotate. As shown in FIG. 28B, the rotational movement of anvil 184 swings lobe 194' upward and outward from the interior of carton 30a. Preferably (when assembling standard one quart cartons), the radial distance from the center of anvil 184 to each mandrel 208 is about 3 inches. This geometrical configuration enables lobe 194 to disengage from carton 30 without interfering with its horizontal movement along conveyor 32. It is also important that speed of the rotational movement of the anvil 184 be matched to the speed of the horizontal movement of the conveyor 32 so that anvil 184 does not contact carton 30a, as discussed below.

Also visible in FIG. 28B is the movement of lobe 194" away from escapement 140 and toward carton 30, which carton conveyor 32 is moving forward. It will be observed that mandrel 208" of lobe 194" now carries unattached spout 34b. Also, the bottommost cylinder 164a (not shown in FIG. 28B) has been actuated by control system 16 to deposit spout 34c into escapement 140. In the manner described above, vertical accumulator has moved all of the other spouts 34d through 34g downward. A new spout 34h has descended from top transfer chute 70 (shown in FIG. 28A) and occupies the topmost position in vertical accumulation 62.

In FIG. 28C, shaft 200 has completed its 120 degree clockwise rotation, and carton conveyor 32 has completed its index. Lobe 194" now extends downwardly into carton 30b, and mandrel 208" (and spout 34b) is aligned with hole 48. It will be noted also that lobe 194"" is now positioned behind escapement 140 so that its mandrel 208'" is aligned with the unattached spout 34c. As described above (and illustrated in FIG. 28C), shaft 200 extends outwardly to cause translational movement of mandrels 208" and 208'" into the hole 48 (for attachment of spout 34b) and the escapement 140 (for retrieval of spout 34c), respectively. After spout 34b is welded to carton 30b, shaft 200 returns to its retracted position. The conveyor 32 indexes again, and the process described in FIGS. 28A through 28C is repeated with new cartons.

5. Control System

As explained above, there are three aspects to the present invention: feed system 12, applicator system 14 and control system 16. In the preferred embodiment, all three aspects are practiced together. As explained below, control system 16 synchronizes the operation of feed system 12 and applicator system 14, thereby improving the operation and efficiency of both.

The underlying idea behind control system 16 is that as carton conveyor 32 periodically indexes partially formed cartons 30 past anvil 184, feed system will supply anvil 184 with one spout 34 for each successive carton 30. Moreover, anvil 181 will periodically rotate at such speed and at such intervals as to allow its lobes 194 to be positioned inside of passing cartons 30 without interfering with their horizontal movement along carton conveyor 32.

There are numerous known techniques for achieving these timing and motion relationships, including mechanical, pneumatic and hydrolic systems. Preferably, conveyor 32 is driven by a central drive shaft (not shown) which rotates 360 degrees for each indexed movement of carton conveyor 32. A system of gears and cams, sometimes referred as a camco gearbox (not shown) mechanically connects (in any suitable manner) this central drive shaft to the drive source 204 so that the drive source 204 causes shaft 200 to rotate 120 degrees for each full rotation of the central drive shaft. This technique will suitably synchronize the rotation of the anvil 184 to the indexed movement of the conveyor 32.

Figure 29:
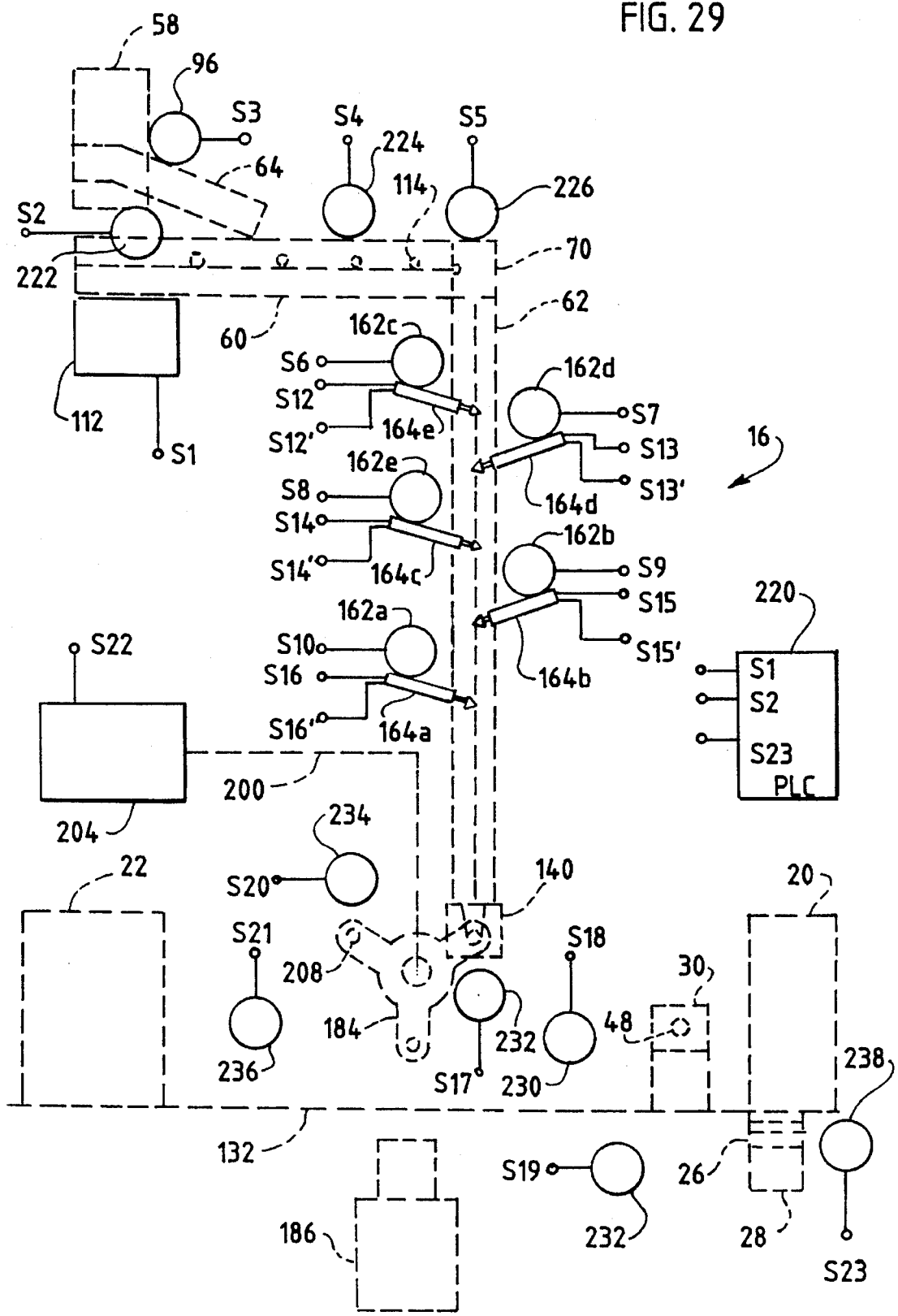
FIG. 29 is a block diagram of the control system of FIG. 1.

To synchronize the operations of anvil 184 with feed system 12 and conveyor 32, the control system 16 is provided. FIG. 29 is a block diagram illustration of control system 16. Sensors 96, 162a–162e, and 222–238 are illustrated, along with drive source 204, pneumatic cylinders 164a through 164e, and spout conveyor motor box 112, and a programmable, digital controller (sometimes refered to as a "PLC") 220. Sensors 96, 162a–162e, and 222–238 are conventional optical sensors which may be mounted in any suitable manner to detect the presence of a spout 34 nearby. Such sensors are widely available from commercial sources such as Allen Bradley Corporation. PLC 220 is also widely available form commercial sources such as Allen Bradley Corporation and is used to implement the logical functions described below. Many alternative systems are available for implementing control system 16, including microprocessor or microcontroller based systems, and the present invention contemplates the use of any suitable system.

For clarity, selected mechanical components of feed system 16, applicator system 14 and carton conveyor 32 are indicated with broken lines in FIG. 29. It is understood that the diagram of FIG. 29 illustrates logical (as opposed to physical) relationships.

As shown in FIG. 29., each of the foregoing components is electronically connected to the PLC 220 for digital communication of signals S1 through S23 therebetween. The following is an explanation of signals S1 through S23.

S1 is a speed control signal generated by the PLC 220 for starting, stopping and controlling the speed of spout conveyor motor 112.

S2 is a speed indication signal generated by optical sensor 222. As shown in FIG. 6B, optical sensor 222 is suitably mounted along the top wall 118 of spout conveyor 60 to optically detect the passage of fingers 114. Because fingers 114 are spaced along regular intervals, the frequency at which fingers 114 pass sensor 222 yields the speed at which spout conveyor is moving.

S3 is a "spout present" signal generated by optical sensor 96. As shown in FIGS. 7 and 8, optical sensor 96 is mounted over channel 78 of bottom transfer chute 64 to detect the presence of spouts 34 therein. If spouts 34 are detected, bottom transfer chute 64 is full, and bowl 58 can be momentarily shut off.

S4 is a "spout present" signal generated by optical sensor 222. As shown in FIG. 6B, optical sensor is suitably mounted on top wall 118 of spout conveyor 60 to detect the passage of spouts 24 thereby. If spouts 24 are not being conveyed up spout conveyor 60 sensor 224 does not generate any "spout present signals". The absence of spouts may indicate a failure with the bowl 58 if S2 indicates that the conveyor 60 is operating. Signal 54 can also be used to count the number of spouts 34 entering vertical accumulator 62.

S5 is a "spout present" signal generated by optical sensor 226. As shown in FIG. 6B, optical sensor 226 is suitably mounted near point 66 to detect the passage of a spout 34 on conveyor 60.

S6 through S10 are "spout present" signals generated by optical sensors 162a through 162e, respectively, as discussed above in connection with vertical accumulator 62. (For clarity, there is no S11)

S12 through S16 are "cylinder actuating" signals generated by the PLC 220 for actuating cylinders 164a through 164e respectively (as shown in FIG. 18). As discussed above in connection with vertical accumulator 62, each cylinder is actuated to cause a finger 168 to retract, thereby allowing the passage of a spout 34. In a preferred embodiment, each cylinder 164 also generates a signal S12' through S16' which indicates whether its finger 168 is retracted or extended.

S17 is a "spout present" signal which is generated by sensor 228. As shown in FIG. 6, sensor 228 is mounted in any suitable manner to the front of escapement 140 to detect the presence of a spout 34 therein.

S18 is a "carton present" signal which is generated by sensor 230. As shown in FIG. 6A, sensor 230 is suitably mounted along one side of carton conveyor 32 between applicator system 14 and rotary carton forming station 20. Sensor 230 detects the passing of a carton 30, and is mounted to face toward panels 46 of passing cartons 30 which are opposite hole 48.

S19 is a "hole present" signal which is generated by sensor 232. As shown in FIG. 6A, sensor 232 is suitably mounted along a side of carton conveyor 32 opposite sensor 230, but is positioned somewhat more closely to rotary carton forming station 20. Sensor 232 detects when a carton panel, such as panel 44, is not present. Because sensor 232 is vertically aligned with holes 48 of passing cartons 30, it generates the "hole present" signal S19 when a hole 48 passes in front of it.

S20 is a "failed weld" signal which is generated by sensor 234. As shown in FIG. 25, sensor 234 is suitably mounted to housing 18 so that it is in close proximity to that one of lobes 194 which extends upwardly away from vertical accumulator 62 when anvil is in the anvil operating position. Sensor 234 detects the presence of a spout on the nearby mandrel 208. In the event that a spout welding operation fails, the spout 34 is withdrawn when anvil 184 is retracted by the translational motion of shaft 200. This occurs because there is no weld to retain spout 34 in the hole 48. In that event, when the anvil is next rotated 120 degrees, that particular spout 34 will remain on the mandrel 208 and will be detected by the sensor 234. Thus, by indicating the presence of a spout, sensor 234 in effect generates a "failed weld" signal.

S21 is a "spout not present" signal generated by sensor 236. As indicated in FIG. 6A, sensor 236 is located along conveyor 32 between applicator 214 and carton filling station 22. Sensor 236 is suitably mounted to housing 18 so that it faces panel 44 of passing cartons 30. Sensor 236 is vertically aligned to detect the passing of hole 48. If a spout 34 is not present in hole 48, sensor 236 will cause signal S21 to generate a momentary pulse indicating the presence of hole 48. This pulse acts as a "spout not present" signal.

S22 is an actuator signal for drive source 204 generated by PLC 220 which causes a pneumatic mechanism in drive source 204 (not illustrated) to impart the translational motion on shaft 200 (and, thereby, anvil 184) discussed above in detail.

S23 is a signal from a conventional sensor 238 which detects when carton blank magazine 28 is empty.

During the indexing of conveyor 32, PLC 220 checks signals S18 and S19 to determine if a carton having a proper hole 48 is approaching applicator system 14 on carton conveyor 32. If a proper carton is detected, PLC 220 sets a "call spout" boolean variable (not shown) which indicates that a spout 34 should be advanced by vertical accumulator 62 into escapement 140. If a proper carton is not detected, then PLC 220 resets the "call spout" boolean variable indicating that no spout should be advanced into the escapement 140. Preferably, PLC also actuates a control signal (not shown) to disable fill station 22 when the defective or missing carton is conveyed thereunder.

If the "call spout" variable has been set, then the PLC 220 examines S17 to determine if a spout is already present in escapement 140. If a spout is present, then the spout call operation terminates. Otherwise, a spout is advanced into escapement 140 from vertical accumulator 62, as described above.

When programming the PLC to control the operation of vertical accumulator 62, the following logic is preferably used. Beginning with the bottommost cylinder 164 and moving upward, PLC performs the following operation for each cylinder 164 (the "subject cylinder"). For convenience, cylinders are referred to generally as cylinder 164, or specifically as cylinder 164a, 164b, etc. A similar convention is used for optic sensor 162. The PLC 220 checks that one of signals S13' through S16' which is generated by the next lowest cylinder 164 to determine if that next lowest cylinder 164 is extended. (Note that the bottommost cylinder 164a has no next lowest cylinder. Instead, the condition of the "call spout" boolean variables are examined). The PLC 220 checks that one of signals S7 through S10 generated by the next lowest optical sensor 162 to determine if a spout is present (Note that in the case of the bottommost cylinder, signal S17 is examined). Except for the topmost cylinder 164e, the PLC then checks that one of signals S12' through S15' which is generated by the next highest cylinder 164 to determine if that next highest cylinder is extended. The PLC then checks that one of signals S6 through S11 which is generated by the cylinder's adjacent optical sensor 162 to determine if a spout 34 is present.

After performing each of these checks, the PLC generates that one of signals S12 through S16 to retract and extend the subject cylinder (and, thus, drop the spout trapped thereby) if, based on the foregoing determination, the next lowest cylinder has no spout, the next lowest cylinder is extended, there is a spout presently trapped by the subject cylinder, the next highest cylinder is extended.

The PLC also examines signals S6 and S7. If both indicate that a spout is present, then vertical accumulator is completely full. Therefore, spout conveyor must be stopped when the next spout on conveyor 60 reaches point 66 to prevent additional spouts 34 from being loaded via top transfer chute 70 into vertical accumulator 62. When S5 indicates the presence of a spout at point 66, PLC sets signal S1 to stop conveyor drive motor 112.

In a preferred embodiment, PLC also examines a signal 23 to determine if carton blank magazine 28 is empty. It will be noted that the number spouts which can be held by vertical accumulator is equal to the number of cylinders plus 1 (for the escapement). Preferably, the vertical accumulator can hold a number spouts somewhat greater than the number of cartons 30 which are on carton conveyor at any one time between anvil 184 and blank magazine 28. In this manner, if blank magazine 28 runs empty (as indicated by signal 23), PLC 220 can stop spout conveyor 60 (via signal S1) and the number of spouts accumulated in the escapement and vertical accumulator will be suitable for the remaining number of cartons on conveyor 32.

Upon the completion of the indexed movement of carton conveyor 32, PLC actuates signal S22 which causes drive source 204 to extend and retract shaft 200, thereby imparting the momentary translational motion to anvil 184, discussed in detail above in connection with ultrasonic welding. Signal S22 can also be used to actuate the translational motion of ultrasonic sealer 186. PLC can refrain from actuating signal S22 if it has earlier detected the absences of a properly positioned carton 30, as discussed above in connection with signals S18 and S19. It will be noted that PLC 220 utilizes a conventional sensor (not illustrated) to detect when indexed movement of carton conveyor 32 is complete.

Upon completion of the indexed movement of carton conveyor 32, PLC 220 also examines signal 20 to determine whether a failed weld condition exists. If such a condition exists, then the spout which should have been welded to that one of cartons 30 which has most recently been conveyed past anvil 184 is still on anvil 184. In one embodiment, the spout may be ejected from anvil 184 by suitable manner, such as by a pneumatic source which imparts an ejectment force on the spout through an aperture in each of mandrels 208. Preferably, spout 34 remains on the anvil. On the next indexed movement of conveyor, PLC 220 resets the "call spout" boolean variable so that no spout is deposited in escapement 140 by vertical accumulator. Thus, the spout which remained on the anvil will (in two conveyor index cycles) be again brought into position for welding to a carton.

The PLC 220 also examines signal S21. If signal S21 indicates that a spout 34 is not present on one of cartons 30 which has past anvil 184, the carton must not be filled at filling station 22 because the presence of open hole 48 (without a spout) renders the carton unsuitable for filling. Thus, PLC 220 actuates a signal (not illustrated) to filling station 22 so that the defective carton is not filled.

During the operation of anvil 184 and carton conveyor 32, PLC 220 also monitors spout conveyor 60. PLC 220 checks signal S3 to determine if spouts have filled up bottom transfer chute 64. If they have, then PLC 220 can activate a signal (not shown) to temporarily shut off bowl 58.

PLC 220 also examines signal S4, which detects the presence of spouts along conveyor 60. This information is preferably used in several ways. First, if S4 indicates that no spouts are being conveyed on conveyor 60, and S2 indicates that conveyor 60 is moving, then a malfunction has probably occurred in the vibratory bowl 58 or the bottom transfer chute 64.

Second, PLC 220 can use signal S4 to count the number of spouts 34 which are entering the vertical accumulator. PLC 220 can deduct from this number the number of spouts applied to cartons 30 to determine at any time the current number of spouts in line between sensor 224 and escapement 140. If this number is too low, PLC can speed up conveyor 60 by actuation signal S1 to conveyor motor 112. Contrastingly, if the number is too high, PLC can slow down conveyor motor 112. As the number of spouts in line increases, PLC slows down conveyor motor 112. This is desirable because when vertical accumulator has been filled, conveyor 60 is halted, as discussed above. This stopping is easier if conveyor 60 has been decelerated.

Third, if signal S4 indicates that spouts 34 are no longer being conveyed up conveyor 60, PLC can actuate a signal (not shown) to halt the feeding of paperboard blanks 26. This ensures that the supply of spouts in vertical accumulator 62 will be sufficient for the partially formed cartons 30 which are already in process.

6. Alternative Embodiments.

While the invention has been described with respect to the preferred embodiments, variations modifications, substitutions and alternatives will be apparent to those skilled in the art and accordingly, the scope of the invention should be defined by the appended claims and equivalents thereof.

For example, anvil 184 may be utilized with an entirely different feed system, such as a conventional gravity track system. Anvil 184 can also use an alternative technique for engaging spouts, particularly in the case of spouts having a different shape than spouts 34. Such engagement system could include using a vacuum force or a mechanical grasping mechanism.

What is claimed is:

1. An apparatus for attaching a spout having a flanged end to a preformed hole in an open-ended, partially formed container, comprising:
   (a) an anvil having at least one mandrel projecting therefrom;
   (b) drive means for engaging the flanged end of the spout on said mandrel, for rotating said anvil to pass said mandrel and the spout through the open end of the container, and for inserting the spout into the hole; and
   (c) means for securing the flanged end of the spout to the inner wall of the container.

2. The apparatus of claim 1 wherein said anvil includes a front face having a center portion and a first lobe extending radially from said center portion.

3. The apparatus of claim 2 wherein said mandrel is mounted on said first lobe and extends away from said front face.

4. The apparatus of claim 3 wherein said front face further comprises second and third lobes extending radially from said center portion, said second and third lobes having second and third mandrels, respectively, mounted thereon and extending away from said front face.

5. The apparatus of claim 4 further comprising a conveyor means for conveying the container in a given direction.

6. The apparatus of claim 4 wherein said first, second and third mandrels are perpendicular to said front face.

7. The apparatus of claim 3 wherein said drive means translates said anvil to engage the spout's flanged end between said front face and the inner wall of the container, and said securing means ultrasonically vibrates the container against said front face.

8. The apparatus of claim 3 further comprising a conveyor means for conveying the container in a given direction, said conveyor being adapted for periodic operation.

9. The apparatus of claim 8 wherein said drive means translates said anvil from a first axial position to a second axial position and then retracts said anvil back to said first axial position between said periodic operation of said conveyor means and partially rotates said anvil during said periodic operation.

10. The apparatus of claim 9 wherein said periodic operation includes a first stage and a second stage wherein prior to said first stage said drive means engages the flanged end of the spout on said mandrel and between said first and second stages said drive means inserts said mandrel and the spout into the preformed hole and removes said mandrel from the hole after the spout has been attached to the container by said securing means.

11. The apparatus of claim 10 wherein during said first stage said drive means passes said mandrel and the spout into the open end of the container to align the spout for insertion into the preformed hole, and during said second stage said drive means passes said mandrel out of the open end of the container.

12. The apparatus of claim 3 further comprising a conveyor means for conveying the container in a given direction.

13. The apparatus of claim 3 wherein said mandrel is perpendicular to said front face.

14. The apparatus of claim 1 further comprising an indexed conveyor means for conveying the container in a given direction, said conveyor means being adapted for periodic operation.

15. The apparatus of claim 14, wherein said drive means is synchronized with said periodic operation of said conveyor means, wherein said drive means translates said anvil from a first axial position to a second axial position and then back to said first axial position between said periodic operation and said drive means rotates said anvil during said periodic operation.

16. The apparatus of claim 1 further comprising a conveyor means for conveying the container in a given direction.

17. An apparatus for attaching spouts to partially formed containers having heat-sealable lamination and an open-ended top with a hole formed therein for receiving a spout, comprising:
   (a) conveyor means for conveying the containers in a conveyance direction, said conveyor means being adapted for periodic movement;
   (b) an anvil located adjacent to said conveyor means and having engagement means for engaging a spout, wherein said anvil is adapted for rotational motion about an axis which is transverse to said conveyance direction;

(c) spout delivery means for sequentially delivering spouts to said engagement means;

(d) rotational drive means for periodically rotating said anvil to position said engagement means inside one of the containers so that a spout engaged by said engagement means is aligned for insertion into the container's hole, wherein said rotation is synchronized with the periodic movement of said conveyor;

(e) inserting means for periodically imparting a translational movement to said anvil to insert a spout engaged by said engagement means into the hole of the container; and (f) sealing means for attaching a spout engaged by said engagement means to a container when the spout is inserted by said inserting means into the container's hole.

18. The apparatus of claim 17 wherein said anvil includes a plurality of lobes extending radially from a center portion.

19. The apparatus of claim 18 wherein said engagement means includes a plurality of mandrels, at least one of said mandrels being mounted on each of said lobes.

20. The apparatus of claim 18 wherein said plurality of lobes is three in number.

21. The apparatus of claim 17 wherein said anvil has an anvil surface adjacent to said engagement means, and said inserting means imparts a first translational motion to said anvil to insert a spout engaged by said engagement means into the hole and to place the spout's annular flange between said anvil surface and a portion of the inner wall of the container.

22. The apparatus of claim 21 wherein:

said anvil includes a plurality of radially extending lobes;

said engagement means comprises a plurality of mandrels, at least one of said mandrels being mounted on each of said lobes; and said anvil is positioned relative to said spout delivery means so that said first translational motion places one of said mandrels in operative communication with said spout delivery means.

23. The apparatus of claim 21 wherein said inserting means imparts a second translational motion to withdraw said engagement means from the spout after the spout has been attached to the inner wall of the container by said sealing means.

24. The apparatus of claim 23 wherein said inserting means imparts said first and second translational motions between said periodic movement of said conveyor means.

25. The apparatus according to claim 21 wherein said anvil surface is circumjacent to said mandrel, and said sealing means includes means for welding said portion of the container to the spout.

26. The apparatus according to claim 21 wherein said anvil surface is circumjacent to said mandrel, and said sealing means includes means for ultrasonically vibrating said portion of the container against said anvil surface, said container portion being the area around said preformed hole.

27. The apparatus according to claim 26 wherein said ultrasonic vibrating means momentarily melts heat-sealable lamination covering said container portion.

28. The apparatus of claim 7 further comprising control means for periodically generating a control signal, wherein said spout delivery means is responsive to said control signal for delivering a spout for engagement by said engagement means.

29. The apparatus of claim 28 wherein said spout delivery means comprises:

escapement means for holding a spout in a position for engagement by said engagement means;

an elongated channel extending upwardly from said escapement means through which spouts pass into said escapement means, said channel having an upwardly extending mouth for receiving spouts; and channel blocking means responsive to said control signal and positioned along said channel for selectively allowing the passage of a spout through said channel and into said escapement means.

30. The apparatus according to claim 29 wherein:

said inserting means imparts a first translational motion to said anvil in a direction substantially transverse to said conveyance direction;

said anvil includes a plurality of radially extending lobes;

said engagement means comprises a plurality of mandrels, at least one of said mandrels being mounted on each of said lobes; and said anvil is positioned relative to said spout engagement means so that said first translational motion places one of said mandrels into engagement of a spout held by said escapement means.

31. The apparatus of claim 28 wherein said control means includes first detecting means for detecting when a container is approaching said anvil on said conveyor means; wherein said control means generates said control signal only when a container is approaching said anvil on said conveyor means.

32. The apparatus of claim 31 wherein said control means includes second detecting means for detecting the presence of a hole in a container being conveyed by said conveyor means toward said anvil.

33. The apparatus of claim 32 wherein said control means is responsive to said first and second detecting means for generating said control signal if said conveyor means is conveying a container having a hole toward said anvil.

34. The apparatus of claim 33 wherein said first and second detecting means include optical sensors.

35. The apparatus of claim 17 further comprising first sensor means for generating a fill control signal indicating the presence or absence of a spout on a container after the container is conveyed by said conveyor means past said sealing means.

36. The apparatus of claim 35 wherein said first sensor means comprises an optical sensor located along said conveyor means for sensing the presence of a spout on one of said containers.

37. The apparatus of claim 35 further comprising filling means responsive to said fill control signal for filling a partially-formed container with a substance when said fill signal indicates the presence of a spout on the container.

38. The apparatus of claim 17 wherein said inserting means imparts a first translational motion to said anvil to insert said engagement means into the hole and a second translational motion to withdraw said engagement means from the hole.

39. A method for attaching spouts to partially formed containers, each container having an open-ended top with a hole formed therein for receiving a spout, comprising:

(a) providing a rotatable anvil having an axis of rotation and comprising at least first and second lobes extending radially at angular intervals around said axis, and first and second engagement means for releasably engaging a spout, said first and second engagement means being mounted on said first and second lobes, respectively.

(b) conveying containers under said anvil in an indexed movement along a conveyance path, said conveyance path being transverse to said axis of rotation;

(c) moving said anvil in a first translational direction to position a first spout on said first engagement means and then in a second, opposite translational direction to return said anvil to its original axial position;

(d) rotating said anvil during indexed movement of the conveyor so that said first lobe is placed into the interior of the container with said first engagement means and the first spout thereon is aligned with the container's hole;

(e) moving said anvil in said first translational direction again to:
insert said first engagement means and the first spout into the container's hole and simultaneously
position a second spout on said second engagement means; and (f) after movement in said first translational direction, sealing the spout inserted at step (e) to the container.

40. The method according to claim 39 further comprising the step of moving said anvil in said second translational direction to withdraw said first engagement means from the container's hole, leaving the first spout secured therein, and simultaneously withdraw said second engagement means and the second spout.

41. The method according to claim 39 wherein the step of delivering a spout to said engagement means includes the steps of examining said anvil to determine if a spout is already present on one of said engagement means, and delivering a spout only when no spout is already present.

42. The method according to claim 39 wherein the spouts have annular flanges, and step (f) includes the steps of:

positioning the first spout's annular flange between said first lobe and the interior side of the container around the container's hole; and ultrasonically vibrating the container against the first spout's annular flange and said first lobe.

43. A carton filling machine including a pouring spout application station for locating a pouring spout in a preformed hole in the upper regions of an open-topped, partly-formed carton, the pouring spout application station comprising a rotatable anvil provided with at least one mandrel projecting therefrom, the anvil being indexed such that, during rotation thereof, i) a pouring spout is positioned on the mandrel;

ii) the mandrel enters the open top of the stationary carton and aligns the mandrel and the pouring spout thereon with the hole in the upper regions of the carton;

iii) the pouring spout is displaced to extend through the hole in the upper regions of the carton;

iv) the inner end of the pouring spout is secured to the inner wall of the upper regions of the carton, and v) the mandrel on the anvil is withdrawn from the secured pouring spout.

44. An apparatus for attaching spouts to a partly-formed container having an open-ended top with a pre-cut hole formed therein for receiving a spout, comprising:

(a) a weld station suitable for welding a spout to the container;

(b) a conveyor which moves the partly formed container past the weld station;

(c) a rotating welding backup plate including a first spout engager, said backup plate located adjacent said conveyor so that rotation of said backup plate positions said first spout engager inside the moving open-ended container;

(d) a supply chute located adjacent said backup plate to supply a spout to said backup plate's first spout engager; and (e) translational drive means for engaging said container and said backup plate to insert said spout into the pre-cut hole at said weld station;

wherein said weld station welds the spout while said backup plate is engaged with the container.

45. The apparatus of claim 44 wherein said welding backup plate includes a first lobe having an anvil surface.

46. The apparatus of claim 45 wherein said first spout engager is mounted on said first lobe; and wherein said anvil surface is adjacent to said first spout engager.

47. The apparatus of claim 46 wherein said welding backup plate further comprises a second lobe having a second spout engager thereon and a second anvil surface adjacent to said second spout engager.

48. The apparatus of claim 44 wherein said first spout engager is a mandrel.

49. The apparatus of claim 44 wherein said welding backup plate includes an anvil surface, wherein a portion of the spout is placed between the container and said anvil surface when said translational drive means engages the container and said backup plate; wherein said weld station ultrasonically vibrates the spout and container against said anvil surface to weld the spout to the container.

50. The apparatus of claim 44 wherein said conveyor is adapted for periodic movement along a conveyance direction, and the rotation of said welding backup plate is about an axis of rotation that is normal to said conveyance direction, and is synchronized with said periodic movement.

51. The apparatus of claim 44 wherein said translational drive means imparts a first translational motion to said welding backup plate to insert the spout positioned thereon into the hole.

52. The apparatus of claim 51 wherein said drive means imparts a second translational motion to withdraw said first spout engager from the spout after the spout has been secured to the container by said weld station.

53. The apparatus of claim 52 wherein said first translational motion engages said first spout engager with said supply chute, and said second translational motion disengages said first spout engager and said supply chute.

54. The apparatus of claim 52, wherein said conveyor is adapted for indexed movement; and wherein rotation of said welding backup plate occurs during said indexed movement, and said first and second translational motions occur between said indexed movement of said conveyor.

55. An apparatus for attaching a spout to a partially formed container having an open-ended top with a hole formed therein, comprising:

(a) an anvil including a spout engager and an anvil surface adjacent to said spout engager;

(b) a spout supplier located adjacent said anvil;

(c) a conveyor which moves the open-ended container past said anvil;

(d) drive means for moving said anvil's spout engager from said spout supplier to the container's interior so that a spout held by said spout engager is inserted into the container's hole, and a portion of the spout is placed between said anvil surface and the container adjacent to the hole; and (e) means for securing the spout to the container while the spout is held by said spout engager.

56. The apparatus of claim 55, wherein said drive means moves said anvil's spout engager by rotating at least a portion of said anvil.

57. The apparatus of claim 55 wherein said spout engager is a mandrel sized and shaped to receive the spout thereon.

58. The apparatus of claim 55 wherein said anvil includes a center portion and a first lobe extending from said center portion, said fist lobe including said spout engager and said anvil surface.

59. The apparatus of claim 58 wherein said anvil further comprises a second lobe extending from said center portion and having a second spout engager thereon and a second anvil surface adjacent to said second spout engager.

60. The apparatus of claim 55 wherein said conveyor is adapted for periodic movement along a conveyance direction, and the rotation of said anvil is synchronized with said periodic movement of said conveyor, and is about an axis of rotation that is normal to said conveyance direction.

61. The apparatus of claim 55 wherein said drive means imparts a first translational motion to said anvil to insert the spout positioned thereon into the hole.

62. The apparatus of claim 61 wherein said drive means imparts a second translational motion to withdraw said spout engager from the spout after the spout has been secured to the container by said securing means.

63. The apparatus of claim 62 wherein said first translational motion engages said spout engager with said spout supplier, and said second translational motion disengages said spout engager and said spout supplier.

64. The apparatus of claim 55, wherein said conveyor is adapted for indexed movement; and wherein rotation of said anvil is synchronized with said indexed movement of said conveyor, so that said rotation of said anvil occurs during said periodic operation of said conveyor and said first and second translational motions occur between said indexed movement of said conveyor.

65. The apparatus of claim 55, wherein the said securing means ultrasonically vibrates the spout against the said anvil surface.

66. A method for attaching a spout to a container having an open-ended top with a hole formed therein for receiving the spout, comprising the steps of:
  (a) placing a spout on an anvil;
  (b) conveying the container toward said anvil;
  (c) as the container approaches said anvil, moving at least a portion of said anvil along a curved path so that the spout enters the open top of the moving container;
  (d) inserting the spout into the hole; and
  (e) attaching the spout to the container while the spout is still on said anvil.

67. The method of claim 66, wherein the step of moving said anvil portion along a curved path is accomplished by rotating said anvil.

68. The method of claim 67, wherein the step of moving said anvil portion causes the spout to be brought into alignment with the container hole.

69. The method of claim 66, wherein the step of conveying the container is performed in indexed movements, and wherein the step of moving the anvil takes place during the time between said indexed conveyor movements.

70. The method of claim 69, wherein the step of inserting the spout into the hole is accomplished by translating the anvil toward the container in between said indexed conveyor movements.

71. The method of claim 66, wherein the step of sealing the spout to the container is accomplished by ultrasonically vibrating the spout against said anvil surface.

72. A method for attaching a spout to an open-topped container having a preformed hole formed therein, comprising the steps of:
  (a) providing an anvil having means to hold a spout;
  (b) placing the spout onto said anvil;
  (c) conveying the container toward said anvil;
  (d) while said container is moving, rotating said anvil to position said spout inside the container in alignment with the hole;
  (e) while keeping the spout on the anvil, inserting the spout into the hole;
  (f) attaching the spout to the container; and
  (f) withdrawing the anvil from the container after the spout has been attached.

73. The method of claim 72, wherein the step of conveying the container is performed in indexed movements, and wherein the step of moving the anvil takes place during said indexed conveyor movements.

74. The method of claim 73, wherein the step of inserting the spout into the hole is accomplished by translating the anvil toward the container during the time between said indexed conveyor movements.

75. The method of claim 72 wherein the step of attaching the spout to the container is accomplished by ultrasonically vibrating the spout.

76. The apparatus of claim 3 further comprising a conveyor means for conveying the container in a given direction, said conveyor being adapted for repeating first and second periodic operations.

77. The apparatus of claim 76 wherein prior to said first periodic operation said drive means translates said anvil from a first axial position to a second axial position to engage the flanged end of the spout on said mandrel and then retracts said anvil back to said first axial position.

78. The apparatus of claim 77 wherein during said first periodic operation said drive means partially rotates said anvil until the spout and said mandrel are aligned with the preformed hole in the container.

79. The apparatus of claim 78 wherein between said first and second periodic operations said drive means translates said anvil again from said first axial position to said second axial position to insert the spout into the preformed hole and then retracts said anvil back to said first position.

80. The apparatus of claim 79 wherein said securing means ultrasonically vibrates the container against said front face to secure the flanged end of the spout to the inner wall of the container when said anvil is in said second axial position.

81. The apparatus of claim 80 wherein during said second periodic operation said drive means further rotates said anvil to exit said mandrel from the open end of the container.

82. An apparatus for attaching spouts having flanged ends from a source of spouts to preformed holes in open-ended, partially formed containers from a source of containers, comprising:
  (a) an anvil having at least one mandrel projecting therefrom;
  (b) driving means for engaging the flanged end of a spout from the spout source on said mandrel, for partially rotating said anvil to pass said mandrel and the spout through the open end of a first container from the container source and for inserting the spout in the preformed hole; and
  (c) means for securing the flanged end of the spout to the inner wall of the container.

83. The apparatus of claim 82 wherein said anvil includes a front face having a center portion and a first lobe extending radially from said center portion wherein said mandrel is mounted on said first lobe and extends away from said front face.

84. The apparatus of claim 83 wherein said front face further comprises a second lobe extending radially from said center portion, said second lobe having a second mandrel mounted thereon extending away from said front face.

85. The apparatus of claim 84 wherein said second mandrel is perpendicular to said front face.

86. The apparatus of claim 83 wherein said mandrel is perpendicular to said front face.

87. The apparatus of claim 82 further comprising a conveyor means for conveying the containers from the continuous container source of containers in a given direction, said conveyor means having repeating first and second periodic operations.

88. The apparatus of claim 87 wherein prior to said first periodic operation said drive means translates said anvil from a first axial position to a second axial position to engage the flanged end of a first spout from the spout source on said first mandrel and then retracts said anvil back to said first axial position.

89. The apparatus of claim 88 wherein during said first periodic operation said drive means partially rotates said anvil until the spout and said first mandrel are aligned with the preformed hole of the first container and said second mandrel is aligned with a second spout from the spout source.

90. The apparatus of claim 89 wherein between said first and second periodic operations said drive means translates said anvil again from said first axial position to said second axial position to insert the first spout and said first mandrel into the preformed hole and simultaneously engage the second spout on said second mandrel and then retracts said anvil back to said first axial position.

91. The apparatus of claim 90 wherein said securing means ultrasonically vibrates the first container against said front face to secure the flanged end of the first spout to the inner wall of the first container when said anvil is in said second axial position.

92. The apparatus of claim 89 wherein during said second periodic operation said drive means further rotates said anvil to simultaneously (a) pass said first lobe out of said first container and (b) pass said second lobe into the open end of the second container from said container source and align the second spout and said second mandrel with the preformed hole of the second container.

93. The apparatus of claim 92 wherein between said second periodic operation and said first periodic operation said drive means translates said anvil from said first axial position to said second axial position to simultaneously (a) insert the second spout and said second mandrel into the preformed hole of the second container and (b) engage the flanged end of the next spout on said first mandrel and then retracts said anvil back to said first axial position.

94. The apparatus of claim 93 wherein said securing means ultrasonically vibrates the second container against said front face to secure the flanged end of the second spout to the inner wall of the second container when said anvil is in said second axial position.

95. An apparatus for attaching spouts from a spout accumulator to preformed holes in open-ended, partially formed containers being indexed by conveyor means having repeating first and second periodic operations, each of the spouts having a flanged end, comprising:

(a) an anvil including a front face having a center portion;

(b) first, second and third lobes extending radially from said center portion;

(c) first, second and third mandrels mounted on said first, second and third lobes, respectively, and extending away therefrom;

(d) drive means for periodically translating and rotating said anvil in synchronization with the indexed conveyor means to engage spouts from the spout accumulator, rotate the engaged spouts into the open-ended containers and insert the spouts into the preformed holes; and (e) means for securing each spout to the inner wall of successive containers.

96. The apparatus of claim 95 wherein prior to the first periodic operation said drive means translates said anvil from a first axial position to a second axial position to engage the flanged end of the first spout from the spout source on said first mandrel and then retracts said anvil back to said first axial position.

97. The apparatus of claim 96 wherein during the first periodic operation said drive means partially rotates said anvil until the first spout and said first mandrel align with the preformed hole of the first container on said conveyor means and said second mandrel simultaneously aligns with a second spout from the spout accumulator.

98. The apparatus of claim 97 wherein between the first and second periodic operations said drive means translates said anvil from said first axial position to said second axial position to (a) insert the first spout and said first mandrel into the preformed hole of the first container and (b) engage a second spout from the spout accumulator on said second mandrel, and then said drive means retracts said anvil back to said first axial position.

99. The apparatus of claim 98 wherein said securing means ultrasonically vibrates the first container against said front face to secure the flanged end of the first spout to the inner wall of the first container when said anvil is in said second axial position.

100. The apparatus of claim 99 wherein during the second periodic operation said drive means further rotates said anvil to simultaneously (a) exit said first mandrel from said first container, (b) pass said second mandrel and the second spout into the open end of the second container and align said second mandrel and the second spout with the preformed hole of the second container, and (c) align said third mandrel with a third spout from said spout accumulator.

101. The apparatus of claim 100 wherein after the second periodic operation and before repeating the first periodic operation said drive means translates said anvil from said first axial position to said second axial position to (a) insert the second spout and said second mandrel into the preformed hole of the second container and (b) engage a third spout from the spout accumulator on said second mandrel, and then said drive means retracts said anvil back to said first axial position.

102. The apparatus of claim 101 wherein said securing means ultrasonically vibrates the second container against said front face to secure the flanged end of the second spout to the inner wall of the second container when said anvil is in said second axial position.

103. The apparatus of claim 95 wherein said first, second and third mandrels are perpendicular to said first, second and third lobes, respectively.

104. An apparatus for attaching spouts to preformed holes in open-ended partially formed containers being indexed by conveyor means having repeating first and second periodic operations, each of the spouts having a flanged end, comprising:

(a) an anvil having a front face, said front face including a center portion and multiple lobes extending radially from said center portion;

(b) a mandrel mounted on each lobe and extending away therefrom;

(c) drive means for periodically translating and rotating said anvil in synchronization with the indexed conveyor means such that said anvils periodically engage the spouts on said mandrels, rotate the engaged spouts into the open-ended containers and insert the spouts into the preformed holes; and (d) means for securing the spouts to the inner wall of the containers.

105. The apparatus of claim 104 wherein one mandrel engages a spout and simultaneously another mandrel inserts an engaged spout into the preformed hole.

106. The apparatus of claim 104 wherein each said mandrel is perpendicular to said front face.

107. A method of attaching spouts to preformed holes in partially-formed containers, each spout having a flanged end, comprising the steps of:

engaging the flanged end of a spout on a mandrel connected to an anvil;

rotating said anvil to pass the spout and said mandrel through the open end of the container;

inserting said mandrel and the spout into the preformed hole; and securing the spout to the inner wall of the container while the spout is engaged by said mandrel.

108. A method of attaching spouts to preformed holes in partially-formed containers, the spouts having flanged ends, comprising the steps of:

conveying containers along a conveyor in indexed movement;

positioning a spout applicator having lobes radially extending therefrom adjacent the conveyor;

engaging the flanged end of a spout on a mandrel connected to one of said lobes;

rotating said spout applicator and passing said mandrel and the spout through the open end of the container during indexed movement of said conveyor;

inserting said mandrel and the spout into the preformed hole and securing the spout to the inner wall of the container between indexed movement of said conveyor;

withdrawing said mandrel from the hole and simultaneously releasing the spout from said mandrel; and rotating said spout applicator and passing said mandrel out through the open end of the container during the next indexed movement of said conveyor.

\* \* \* \* \*

UNITED STATES PATENT AND TRADEMARK OFFICE
CERTIFICATE OF CORRECTION

PATENT NO.   : 5,484,374 C1                                        Page 1 of 1
DATED        : January 21, 2003
INVENTOR(S)  : Jerry G. Bachner and A.S. Worrell It is certified that error appears in the above-identified patent and that said Letters Patent is hereby corrected as shown below:

Column 1,
Line 46, delete "mandred" and insert -- mandrel --

Column 2,
Line 40, delete "translation" and insert -- translational --

Column 4,
Line 50, delete "extenting" and insert -- extending --

Signed and Sealed this

Tenth Day of June, 2003

JAMES E. ROGAN
*Director of the United States Patent and Trademark Office*

(12) REEXAMINATION CERTIFICATE (4724th)
United States Patent
Bachner et al.

(10) Number: US 5,484,374 C1
(45) Certificate Issued: Jan. 21, 2003

(54) METHOD AND APPARATUS FOR ATTACHING A SPOUT TO A CONTAINER

(75) Inventors: Jerry G. Bachner, Algonquin, IL (US); A. S. Worrell, Algonquin, IL (US)

(73) Assignee: Nimco Corporation, Crystal Lake, IL (US)

Reexamination Request:
No. 90/006,131, Oct. 17, 2001

Reexamination Certificate for:
Patent No.: 5,484,374
Issued: Jan. 16, 1996
Appl. No.: 07/783,038
Filed: Oct. 25, 1991

(51) Int. Cl.⁷ .................................................. B31B 1/90
(52) U.S. Cl. .............................. 493/87; 493/12; 493/14; 53/133.2
(58) Field of Search ............................ 493/87; 53/133.2

(56) References Cited

U.S. PATENT DOCUMENTS 3,633,470 A * 1/1972 Bingham

OTHER PUBLICATIONS

Field Packaging brochure, Mar. 1991.

* cited by examiner

*Primary Examiner*—Eugene L. Kim

(57) ABSTRACT

An applicator and accompanying feed mechanism attaches spouts and other fitments to paperboard cartons and the like in automated packaging equipment. The applicator features a rotatable and translatable anvil having a plurality of radially extending lobes. A mandrel or other engagement mechanism on each lobe engages and holds spouts for attachment to a container. The anvil inserts a spout into a container hole, and an ultrasonic sealer ultrasonically vibrates the carton wall against the anvil to weld the spout to the carton.

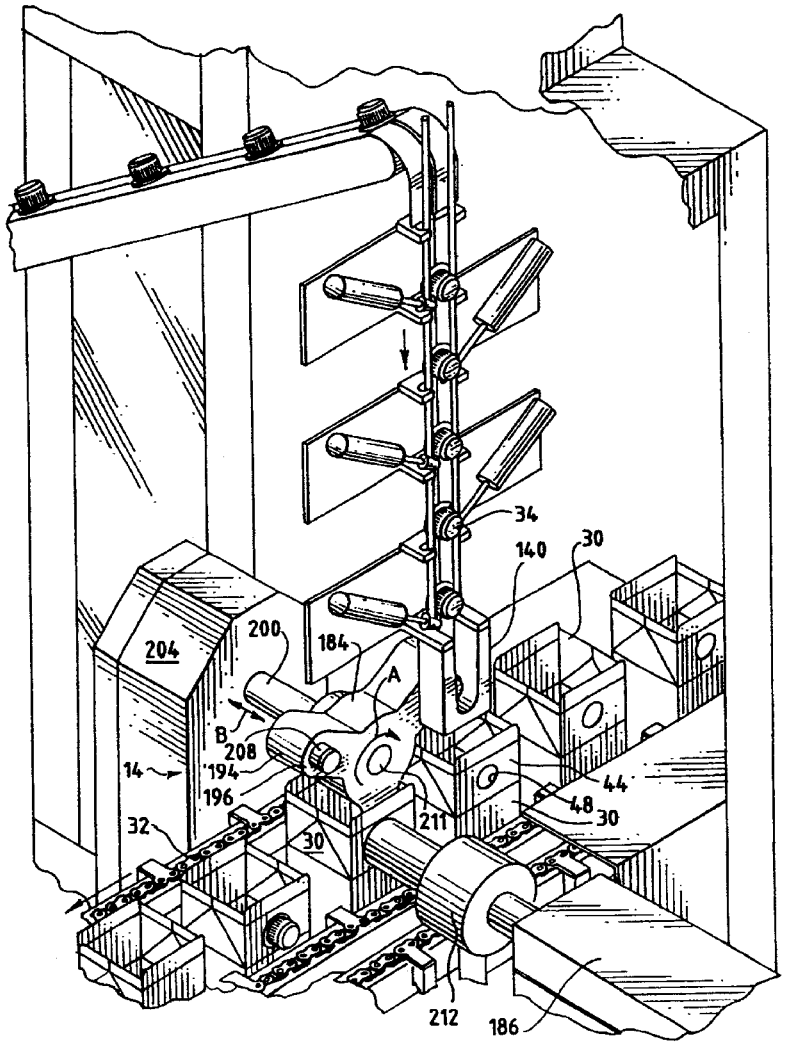

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–42 and 76–106 is confirmed.

Claim 59 is cancelled.

Claims 43–58, 61–63, 65–75 and 107, 108 are determined to be patentable as amended.

Claims 60 and 64 dependent on an amended claim, are determined to be patentable.

43. A carton filling machine including a pouring spout application station for locating a pouring spout in a pre-formed hole in the upper regions of an open-topped, partly-formed carton, the pouring spout application station comprising a rotatable anvil provided with at least [one mandrel] *first and second mandrels* projecting therefrom, the anvil being indexed such that, during rotation thereof
  i) a *first* pouring spout is positioned on [the] *said first* mandrel;
  ii) [the] *said first* mandrel [enters] *and said first pouring spout thereon enter* the open top of the stationary carton and [aligns the mandrel and the pouring spout thereon] *are aligned* with the hole in the upper regions of the carton;
  iii) [the] *said first* pouring spout is displaced to extend through the hole in the upper regions of the carton, *while simultaneously said second mandrel is displaced to position a second pouring spout thereon*;
  iv) the inner end of [the] *said first* pouring spout is secured to the inner wall of the upper regions of the carton, and
  v) [the] *said first* mandred on the anvil is withdrawn from the secured *said first* pouring spout.

44. An apparatus for attaching spouts to a partly-formed container having an open-ended top with a pre-cut hole formed therein for receiving a spout, comprising:
  (a) a weld station suitable for welding a spout to the container;
  (b) a conveyor which moves the partly formed container past the weld station;
  (c) [a] *first and second* rotating welding backup [plate] *plates* including [a] first *and second* spout [engager] *engagers, respectively*, said *first and second* backup [plate] *plates being* located adjacent said conveyor so that rotation of said *first and second* backup [plate] *plates* positions said first spout engager *and said first backup plate* inside the moving open-ended container;
  (d) a supply chute located adjacent said *first and second* rotating backup [plate] *plates* to supply a *first* spout to said *first* backup plate's *said* first spout engager; and
  (e) translational drive means for engaging said container and said *first* backup plate to insert said *first* spout into the pre-cut hole at said weld station *and to simultaneously supply a second spout from said supply chute to said second backup plate's said second spout engager*; wherein said weld station welds [the] *said first* spout while said *first* backup plate is engaged with the container.

45. The apparatus of claim 44 wherein said *first and second* welding backup [plate includes a] *plates include, respectively,* first *and second* [lobe] *lobes* having [an] *first and second* anvil [surface] *surfaces, respectively.*

46. The apparatus of claim 45 wherein said first spout engager is mounted on said first lobe; and wherein said *first* anvil surface is adjacent to said first spout engager.

47. The apparatus of claim 46 wherein said *second* welding backup plate further comprises [a] *said* second lobe having [a] *said* second spout engager thereon and [a] *said* second anvil surface adjacent to said second spout engager.

48. The apparatus of claim 44 wherein *each of* said first *and second* spout [engager] *engagers* is a mandrel.

49. The apparatus of claim 44 wherein said *first and second* welding backup [plate includes an] *plates include, respectively, first and second* anvil [surface] *surfaces,* wherein a portion of [the] *said first* spout is placed between the container and said *first* anvil surface when said translational drive means engages the container and said *first* backup plate; wherein said weld station ultrasonically vibrates [the] *said first* spout and container against said *first* anvil surface to weld [the] *said first* spout to the container.

50. The apparatus of claim 44 wherein said conveyor is adapted for periodic movement along a conveyance direction, and the rotation of said *first and second* welding backup [plate] *plates* is about an axis of rotation that is normal to said conveyance direction, and is synchronized with said periodic movement.

51. The apparatus of claim 44 wherein said translational drive means imparts a first translational motion to said *first* welding backup plate to insert [the] *said first* spout positioned thereon into the hole.

52. The apparatus of claim 51 wherein said drive means imparts a second translation motion to withdraw said first spout engager from [the] *said first* spout after [the] *said first* spout has been secured to the container by said weld station.

53. The apparatus of claim 52, wherein said first translational motion engages said [first] *second* spout engager with said supply chute, and said second translational motion disengages said [first] *second* spout engager and said supply chute.

54. The apparatus of claim 52, wherein said conveyor is adapted for indexed movement; and wherein rotation of said *first and second* welding backup [plate] *plates* occurs during said indexed movement, and said first and second translational motions occur between said indexed movement of said conveyor.

55. An apparatus for attaching a spout to a partially formed container having an open-ended top with a hole formed therein, comprising:
  (a) an anvil including [a] *first and second* spout [engager] *engagers* and [an] *first and second* anvil [surface] *surfaces adjacent, respectively,* to *each of* said *first and second* spout [engager] *engagers*;
  (b) a spout supplier located adjacent said anvil;
  (c) a conveyor which moves the open-ended container past said anvil;
  (d) drive means for moving said anvil's *said first* spout engager from said spout supplier to the container's interior so that a *first* spout held by said *first* spout engager is inserted into the container's hole, *said drive means simultaneously moving said anvil's said second spout engager to a position adjacent said spout sup-*

*plier so that a second spout held by said spout supplier is engaged by said second spout engager as said first spout held by said first spout engager is inserted into the container's hole,* and a portion of [the] *said first spout held by said first spout engager* is placed between said *first* anvil surface and the container adjacent to the hole; and (e) means for securing [the] *said first* spout *held by said first spout engager* to the container while [the] *said first* spout is held by said *first* spout engager.

56. The apparatus of claim 55, wherein said drive means moves said anvil's *said first and second* spout [engager] *engagers* by rotating at least a portion of said anvil.

57. The apparatus of claim 55 wherein said *first and second* spout [engager is] *engagers are each* a mandrel sized and shaped to receive [the] *a* spout thereon.

58. The apparatus of claim 55 wherein said anvil includes a center portion and [a] *first* [lobe] *and second lobes* extending from said center portion, said first [lobe] *and second lobes* including, *respectively,* said *first and second* spout [engager] *engagers* and said *first and second* anvil [surface] *surfaces.*

61. The apparatus of claim 55 wherein said drive means imparts a first translational motion to said anvil to insert [the] *said first* spout positioned [thereon] *on said first spout engager* into the hole.

62. The apparatus of claim 61 wherein said drive means imparts a second translational motion to withdraw said *first* spout engager from [the] *said first* spout after [the] *said first* spout has been secured to the container by said securing means.

63. The apparatus of claim 62 wherein said first translational motion engages said *second* spout engager with said spout supplier, and said second translational motion disengages said *second* spout engager and said spout supplier.

65. The apparatus of claim 55 wherein [the] said securing means ultrasonically vibrates [the] *said first* spout *on said first spout engager* against [the] said *first* anvil surface.

66. A method for attaching a spout to a container having an open-ended top with a hole formed therein for receiving the spout, comprising the steps of:

(a) placing a *first* spout on an anvil;

(b) conveying the container toward said anvil;

(c) as the container approaches said anvil, moving at least a *first* portion of said anvil along a curved path so that [the] *said first* spout enters the open top of the moving container *while simultaneously moving a second portion of said anvil along the curved path*;

(d) inserting [the] *said first* spout into the hole *while simultaneously placing a second spout on said anvil*; and (e) attaching [the] *said first* spout to the container while [the] *said first* spout is still on said anvil.

67. The method of claim 66, wherein the step of moving said *first and second* anvil [portion] *portions* along a curved path is accomplished by rotating said anvil.

68. The method of claim 67, wherein the step of moving said *first* anvil portion causes [the] *said first* spout to be brought into alignment with the container hole.

69. The method of claim 66, wherein the step of conveying the container is performed in indexed movements, and wherein the step of moving [the] *said* anvil takes place during the time between said indexed conveyor movements.

70. The method of claim 69, wherein the step of inserting [the] *said first* spout into the hole is accomplished by translating [the] *said* anvil toward the container in between said indexed conveyor movements.

71. The method of claim 66, wherein the step of sealing [the] *said first* spout to the container is accomplished by ultrasonically vibrating [the] *said first* spout against [said anvil] *a* surface *of said anvil.*

72. A methof for attaching a spout to an open-topped container having a preformed hold formed therein, comprising the steps of:

(a) providing an anvil having means to hold [a spout] *first and second spouts*;

(b) placing [the] *said first* spout onto said anvil;

(c) conveying the container toward said anvil;

(d) while said container is moving, rotating said anvil to position said *first* spout inside the container in alignment with the hole;

(e) while keeping [the] *said first* spout on [the] *said* anvil, inserting [the ] *said first* spout into the hole *while simultaneously placing said second spout on said anvil*;

(f) attaching [the] *said first* spout to the container; and (g) withdrawing [the] *said* anvil from the container after [the] *said first* spout has been attached.

73. The method of claim 72, wherein the step of conveying the container is performed in indexed movements, and wherein the step of moving [the] *said* anvil takes place during said indexed conveyor movements.

74. The method of claim 73, wherein the step of inserting [the] *said first* spout into the [hold] *hole* is accomplished by translating [the] *said* anvil toward the container during the time between said indexed conveyor movements.

75. The method of claim 72, wherein the step of attaching [the] *said first* spout to the container is accomplished by ultrasonically vibrating [the] *said first* spout.

107. A method of attaching spouts to preformed holes in partially-formed containers, each spout having a flanged end, comprising the steps of: engaging the flanged end of a *first* spout on a *first* mandrel connected to an anvil; rotating said anvil to pass [the] *said first* spout and said *first* mandrel through the open end of the container *and simultaneously rotating said anvil into a position for engaging the flanged end of a second spout on a second mandrel connected to said anvil*; inserting said *first* mandrel and [the] *said first* spout into the pre formed hole *and simultaneously engaging the flanged end of said second spout on said second mandrel connected to said anvil*; securing [the] *said first* spout to the inner wall of the container while [the] *said first* spout is engaged by said *first* mandrel.

108. A method of attaching spouts to preformed holes in partially-formed containers, the spouts having flanged ends, comprising the steps of: conveying containers along a conveyor in indexed movement; positioning a spout applicator having lobes radially extenting therefrom adjacent the conveyor; engaging the flanged end of a *first* spout on a *first* mandrel connected to one of said lobes; rotating said spout applicator and passing said *first* mandrel and [the] *said first* spout through the open end of the container during indexed movement of said conveyor; inserting said *first* mandrel and [the] *said first* spout into the preformed hole, *while simultaneously engaging the flanged end of a second spout on a second mandrel connected to another one of said lobes*; [and] securing [the] *said first* spout to the inner wall of the container between indexed movement of said conveyor; withdrawing said *first* mandrel from the hole and simultaneously releasing [the] *said first* spout from said *first* mandrel; and rotating said spout applicator and passing said *first* mandrel out through the open end of the container during the next indexed movement of said conveyor.

\* \* \* \* \*